United States Patent [19]
Betts et al.

[11] Patent Number: 5,396,519
[45] Date of Patent: Mar. 7, 1995

[54] METHOD AND APPARATUS FOR ADAPTIVELY PROVIDING PRECODING AND PREEMPHASIS CONDITIONING TO SIGNAL DATA FOR TRANSFER OVER A COMMUNICATION CHANNEL

[75] Inventors: William L. Betts, St. Petersburg; Edward S. Zuranski, Largo, both of Fla.

[73] Assignee: AT&T Corp., Murray Hill, N.J.

[21] Appl. No.: 141,301

[22] Filed: Oct. 22, 1993

[51] Int. Cl.[6] ............................................. H04L 25/49
[52] U.S. Cl. ........................................ 375/296; 455/43
[58] Field of Search ..................... 375/11, 12, 39, 58, 375/57, 99, 60, 59; 455/43; 371/43; 329/103

[56] References Cited

U.S. PATENT DOCUMENTS

| | | | |
|---|---|---|---|
| 5,095,497 | 3/1992 | Aman et al. | 375/58 |
| 5,162,812 | 11/1992 | Aman et al. | 375/34 |
| 5,195,107 | 3/1993 | Wei | 375/18 |
| 5,249,200 | 9/1993 | Chen et al. | 375/60 |

OTHER PUBLICATIONS

Telecommunications Industry Association, Paper TR-30.1/93-0623, "ISI Coder-Combined Coding & Precoding", by Rajiv Laroia, AT&T, Baltimore, Md., 14–18 Jun., 1993.
International Telecommunications Union, Telecommunications Standards Sector (ITU-TSS), Period 1993-96, "4D codes for V.fast", Motorola Information Systems, Rockville, Md., May 12–14, 1993.
Telecommunications Industry Association, Paper TR-30, 1/93-04-14, "Implementation of precoding in V.fast" by Vedat Eyuboglu, et al., General DataComm Inc., Motorola Codex, Rockwell International, Atlanta, Ga., 15 Apr. 1993.
CCITT, Paper 989-1992, "Trellis precoding vs. linear pre-emphasis: test results", Motorola Information Systems, Baltimore, Md., Jul. 31–Aug. 2, 1991.

*Primary Examiner*—Stephen Chin
*Assistant Examiner*—Tesfaldet Bocure
*Attorney, Agent, or Firm*—Christopher N. Malvone

[57] ABSTRACT

The relative amounts of additive white noise and proportional noise in a communication channel are compensated for by providing adaptive precoding and preemphasis to signal point signals. The amounts of precoding and preemphasis are controlled using scalars to modify the magnitudes of the precoding and preemphasis signals that are combined with the signal point signals. The values of the scalars are transferred between the transmitter and receiver, and the values can be changed without losing synchronization between the transmitter and receiver.

15 Claims, 23 Drawing Sheets

FIG. 4

|   |   |   |   |   |   |   |
|---|---|---|---|---|---|---|
| d | a | D | A | d | a | $5*2^{-m}$ |
| c | b | C | B | c | b | $3*2^{-m}$ |
| D | A | d | a | D | A | $2^{-m}$ |
| C | B | c | b | C | B | $-2^{-m}$ |
| d | a | D | A | d | a | $-3*2^{-m}$ |
| c | b | C | B | c | b | $-5*2^{-m}$ |

| $Y_0Y_1Y_2$ | $Y_3Y_4Y_5$ | | | | | | | |
|---|---|---|---|---|---|---|---|---|
|  | 000 | 001 | 010 | 011 | 100 | 101 | 110 | 111 |
| 000 | aa | AA | aA | Aa | cc | CC | cC | Cc |
| 001 | bb | BB | bB | Bb | dd | DD | dD | Dd |
| 010 | ac | AC | aC | Ac | ca | CA | cA | Ca |
| 011 | bd | BD | bD | Bd | db | DB | dB | Db |
| 100 | ab | AB | aB | Ab | cd | CD | cD | Cd |
| 101 | bc | BC | bC | Bc | da | DA | dA | Da |
| 110 | ad | AD | aD | Ad | cb | CB | cB | Cb |
| 111 | ba | BA | bA | Ba | dc | DC | dC | Dc |

FIG. 8

| MODULO COUNT | | ORIGINAL SUBSETS | | | | | | | |
|---|---|---|---|---|---|---|---|---|---|
| X CNT | Y CNT | a | b | c | d | A | B | C | D |
| 00 | 00 | a | b | c | d | A | B | C | D |
| 00 | 01 | b | A | D | c | B | a | d | C |
| 00 | 10 | A | B | C | D | a | b | c | d |
| 00 | 11 | B | a | d | C | b | A | D | c |
| 01 | 00 | d | c | B | A | D | C | b | a |
| 01 | 01 | c | D | a | B | C | d | A | b |
| 01 | 10 | D | C | b | a | d | c | B | A |
| 01 | 11 | C | d | A | b | c | D | a | B |
| 10 | 00 | A | B | C | D | a | b | c | d |
| 10 | 01 | B | a | d | C | b | A | D | c |
| 10 | 10 | a | b | c | d | A | B | C | D |
| 10 | 11 | b | A | D | c | B | a | d | C |
| 11 | 00 | D | C | b | a | d | c | B | A |
| 11 | 01 | C | d | A | b | c | D | a | B |
| 11 | 10 | d | c | B | A | D | C | b | a |
| 11 | 11 | c | D | a | B | C | d | A | b | g = 20 g = 40 g = 60

FIG. 29

| Y(k-2) \ Y(k-1) | a | b | c | d | A | B | C | D |
|---|---|---|---|---|---|---|---|---|
| a | 0000 | 0000 | 1000 | 1000 | 0001 | 0001 | 1001 | 1001 |
| b | 1100 | 0100 | 0100 | 1100 | 1101 | 0101 | 0101 | 1101 |
| c | 1010 | 1010 | 0010 | 0010 | 1011 | 1011 | 0011 | 0011 |
| d | 0110 | 1110 | 1110 | 0110 | 0111 | 1111 | 1111 | 0111 |
| A | 0001 | 0001 | 1001 | 1001 | 0000 | 0000 | 1000 | 1000 |
| B | 1101 | 0101 | 0101 | 1101 | 1100 | 0100 | 0100 | 1100 |
| C | 1011 | 1011 | 0011 | 0011 | 1010 | 1010 | 0010 | 0010 |
| D | 0111 | 1111 | 1111 | 0111 | 0110 | 1110 | 1110 | 0110 |

(Y1,Y2,Y3,Y4)

METHOD AND APPARATUS FOR ADAPTIVELY PROVIDING PRECODING AND PREEMPHASIS CONDITIONING TO SIGNAL DATA FOR TRANSFER OVER A COMMUNICATION CHANNEL

CROSS REFERENCE TO RELATED APPLICATIONS

Related subject matter is disclosed in the applications assigned to the same assignee hereof identified as Ser. No. 08/093,508, filed Jul. 16, 1993, entitled "Method and Apparatus for Encoding Data for Transfer Over a Communication Channel" and Ser. No. 08/076603, filed Jun. 14, 1993, entitled "Intersymbol Interference Channel Coding Scheme".

1. Technical Field

This invention relates to encoding data for transfer over a communication channel; more specifically, communicating data over a telephone communication channel which is susceptible to inter-symbol interference.

2. Description of the Prior Art

Communication channels suffer from additive white noise and proportional noise. Additive white noise equally effects both small and large amplitude signals, and proportional noise more strongly effects larger amplitude signals.

Precoding is used to combat additive white noise and preemphasis is used to combat proportional noise. Some prior communication systems use precoding or preemphasis.

Two precoding systems that do not provide preemphasis are disclosed in U.S. Pat. No. 5,162,812 and in a paper disclosed to the Telecommunications Industry Association (TIA).

U.S. Pat. No. 5,162,812, entitled "Technique for Achieving the full Coding Gain of Encoded Digital Signals", discloses a precoding system in which a transmitted signal is encoded using a trellis code and precoded using a generalized partial response filter. FIG. 1 illustrates the transmitter disclosed in the aforementioned U.S. Patent. Serial-to-parallel converter 10 converts the incoming data to parallel words. Trellis encoder 12 encodes the parallel word to provide increased immunity to inter-symbol interference. Symbol mapper 14 maps the trellis encoded word to a signal point in a predefined symbol or signal point constellation. The symbol specified by symbol mapper 14 is in the form of a complex number which is received by precoding unit 16. Precoding unit 16 is used to compensate for signal distortions that are introduced at a receiver when the receiver passes the symbol through a noise whitening filter. Received symbols are passed through a noise whitening filter to compensate for the communication channel's colored noise and thereby improve proper decoding of the trellis code. Precoder 16 includes transversal filter 18 and non-linear filter 20. Non-linear filter 20 is in the form of a modulo device that repeatedly subtracts or adds a value of 2L from its input until its output $\alpha$ satisfies $-L \leq \alpha \leq L$. Non-linear filter 20 is used to compensate for any instability introduced by filter 18. The output of precoder 16 is modulated by modulator 19 using a modulation technique such as QAM (quadrature amplitude modulation). The output of modulator 19 is filtered by filter 21, passed through hybrid 22, and then out to local telephone loop 24.

A similar precoding system is disclosed in a paper presented to Technical Committee TR-30 of the Telecommunications Industry Association (TIA) in Atlanta, Ga. on Apr. 15, 1993. The paper is entitled "Implementation of Precoding in V-fast" authored by Eyuboglu et al. FIG. 2 illustrates the precoder disclosed in the paper. Precoder 30 is similar to precoder 16. In this embodiment both the FIR filter and the modulo device are in the feedback loop. The FIR filter is disclosed as a 3-tap filter and the dither signal or output of the modulo device is subtracted from the input to the precoder.

A paper disclosing precoding or preemphasis was presented to CCITT study group XVII in Baltimore, Md. during Jul. 31–Aug. 2, 1991. The paper, which was provided by Motorola Information Systems, is entitled "Trellis precoding vs. linear preemphasis: test results". The paper discloses a system that has general trellis precoding or linear preemphasis.

The systems described in the U.S. Pat. No. 5,162,812, and in the Eyuboglu paper, precode the data without preemphasis therefore, there is compensation for the effects of additive white noise and less compensation for proportional noise. These systems have additional drawbacks. The first system is only useful for square symbol constellations and thereby prevents using more efficient constellations. The second system uses a relatively large dither signal at low data transmission rates. The large dither signal varies transmitted signal power by a relatively large amount that may exceed the maximum allowable power for the communication channel. As a result, the amount of signal space allotted to the constellation must be decreased to accommodate the variations in transmitted power. Decreasing the constellation's signal space decreases the space between signal points in the constellation and decreases noise immunity.

The system described in the Motorola paper provides precoding and preemphasis, but it does not provide a method for dynamically adjusting the relative amounts of precoding and preemphasis. As a result, the system does not adjust for changing channel conditions.

SUMMARY OF THE INVENTION

With regard to precoding, the present invention is not limited to square constellations as is the system of the '812 patent, and it does not have a relatively large dither signal as does the system of the Eyuboglu paper. Additionally, the present invention provides dynamic adjustment of the relative amounts of precoding and preemphasis to adjust to changing channel conditions.

A decreased dither signal is provided by using a smaller modulo value to generate the dither signal while maintaining the ability to recover the original trellis code in the receiver. The recoverability of the original trellis code is achieved by using a modulo count, which was formed while 5producing the dither signal, to select a substitute constellation subset for the constellation subset identified by the trellis encoder. Additionally, the amounts of precoding and preemphasis are dynamically adjusted by controlling a FIR filter's effect within a precoder and preemphasis device.

BRIEF DESCRIPTION OF THE DRAWING

FIG. 4 illustrates a symbol or signal point constellation;

FIG. 7 is a subset selection table;

FIG. 8 is a subset substitution table;

FIG. 29 illustrates a table used to produce bits $Y_1-Y_4$ of FIG. 28; and

DESCRIPTION OF THE PREFERRED EMBODIMENT

Figure 1:
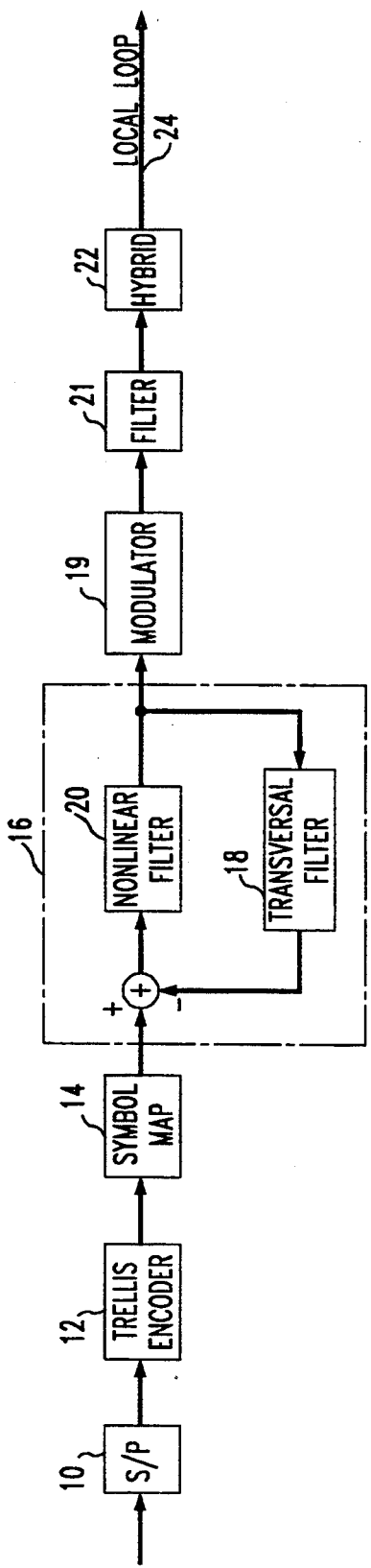
FIG. 1 illustrates a prior art transmitter.
Figure 2:
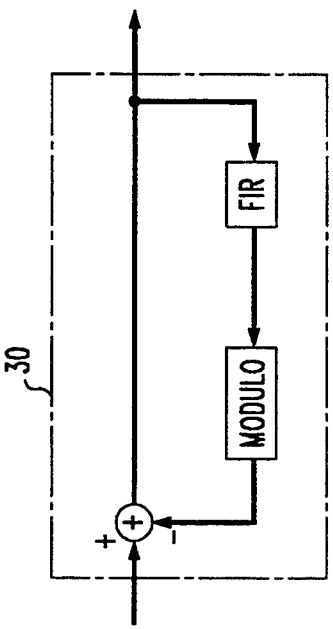
FIG. 2 illustrates a precoder used in a transmitter.
Figure 3:
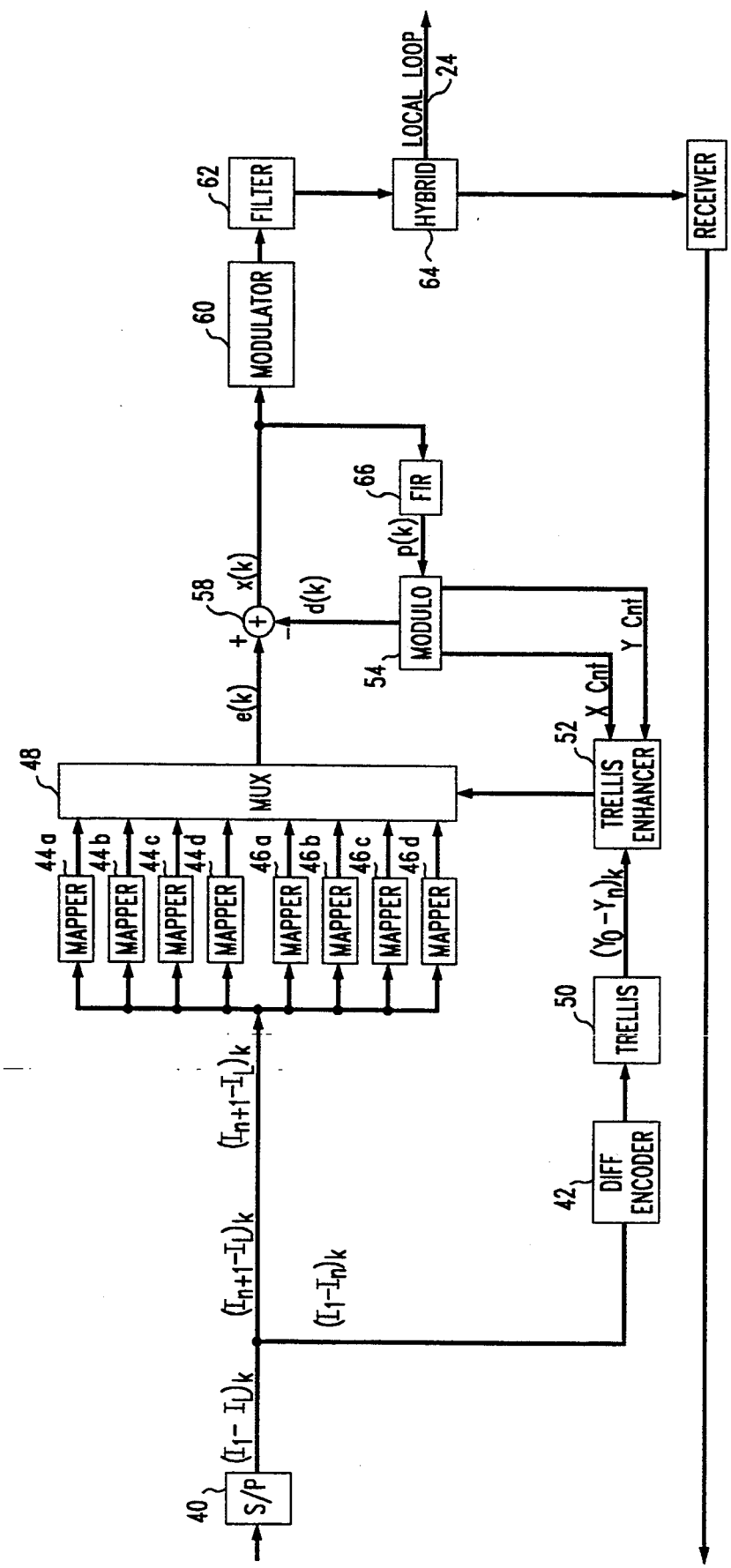
FIG. 3 illustrates the transmitter section of one embodiment of the present invention.

FIG. 3 illustrates the transmitter section of one embodiment of the present invention. Serial data is received by serial-to-parallel converter 40. The output of serial-to-parallel converter 40 is an L-bit word. Bits 1 to n are sent to differential encoder 42, and the remaining n+1 to L bits are sent to symbol mappers 44a, 44b, 44c, 44d, and 46a, 46b, 46c and 46d. Bits n+1 to L are mapped into different signal point or symbol constellation subsets by the mappers. Taken together, the subsets comprise the overall transmit constellation. The output of each mapper is a complex number with orthogonal components. The complex number identifies a symbol in a symbol constellation subset. The outputs from mappers are received by mux 48.

Differential encoder 42 differentially encodes some of bits 1 through n. Differentially encoded bits, as well as the unchanged data bits, are passed to trellis encoder 50. Trellis encoder 50 produces trellis bits $Y_0$ through $Y_n$. Bits $Y_0$ through $Y_n$ are received by trellis enhancer 52. Trellis enhancer 52 also receives inputs X-Cnt and Y-Cnt from modulo device 54. Based on the values $Y_0-Y_n$, and the values of X-Cnt and Y-Cnt, trellis enhancer 52 controls mux 48 to select one of the mapper outputs. The output of mux 48, signal e(k), is received by summer 58. Precoding dither d(k) from modulo device 54 is subtracted from signal e(k) in summer 58. The output of summer 58, signal x(k), is fed to modulator 60, passband filter 62 and hybrid 64. The output of summer 58 is also fed to three-tap finite impulse response (FIR) filter 66. The output of filter 66 is received by modulo device 54 to produce outputs X-Cnt, Y-Cnt and d(k).

During each symbol period, serial-to-parallel converter 40 produces parallel word $(I_1-I_L)_k$. Bits $I_{n+1}-I_L$ are passed to the mappers. The mappers output a signal point or symbol in a predefined constellation subset based on bits $I_{n+1}-I_L$. FIG. 4 illustrates an 8-way partitioned symbol constellation. Bits $I_1-I_L$ are encoded as one of the symbols in the constellation. The constellation shows that there are eight constellation subsets making up the overall constellation. The subsets consist of signal points labeled a, b, c, d, A, B, C and D, where like letters belong to the same subset. In a 4-way partitioned constellation where there are four subsets, the upper and lower case form of each letter is considered part of the same subset. Data bits $I_1$ through $I_n$ and a trellis bit are used to select one of the eight subsets. Data bits $I_{n+1}$ through $I_L$ are used to identify a particular symbol or signal point within the subset.

Differential encoder 42 and trellis encoder 50 use bits $I_1-I_n$ to choose a constellation subset. In this embodiment n=5; however, it may have other values. Differential encoder 40 differentially encodes bits $I_2-I_3$ in accordance with the differential encoding table to produce bits $J_2$ and $J_3$.

| Differential Encoding | | | | | |
|---|---|---|---|---|---|
| Inputs | | Previous Outputs | | Outputs | |
| $I_2$ | $I_3$ | $J_2'$ | $J_3'$ | $J_2$ | $J_3$ |
| 0 | 0 | 0 | 0 | 0 | 1 |
| 0 | 0 | 0 | 1 | 1 | 1 |
| 0 | 0 | 1 | 0 | 0 | 0 |
| 0 | 0 | 1 | 1 | 1 | 0 |
| 0 | 1 | 0 | 0 | 0 | 0 |
| 0 | 1 | 0 | 1 | 0 | 1 |
| 0 | 1 | 1 | 0 | 1 | 0 |
| 0 | 1 | 1 | 1 | 1 | 1 |
| 1 | 0 | 0 | 0 | 1 | 1 |
| 1 | 0 | 0 | 1 | 1 | 0 |
| 1 | 0 | 1 | 0 | 0 | 1 |
| 1 | 0 | 1 | 1 | 0 | 0 |
| 1 | 1 | 0 | 0 | 1 | 0 |
| 1 | 1 | 0 | 1 | 0 | 0 |
| 1 | 1 | 1 | 0 | 1 | 1 |
| 1 | 1 | 1 | 1 | 0 | 1 |

Figure 5:
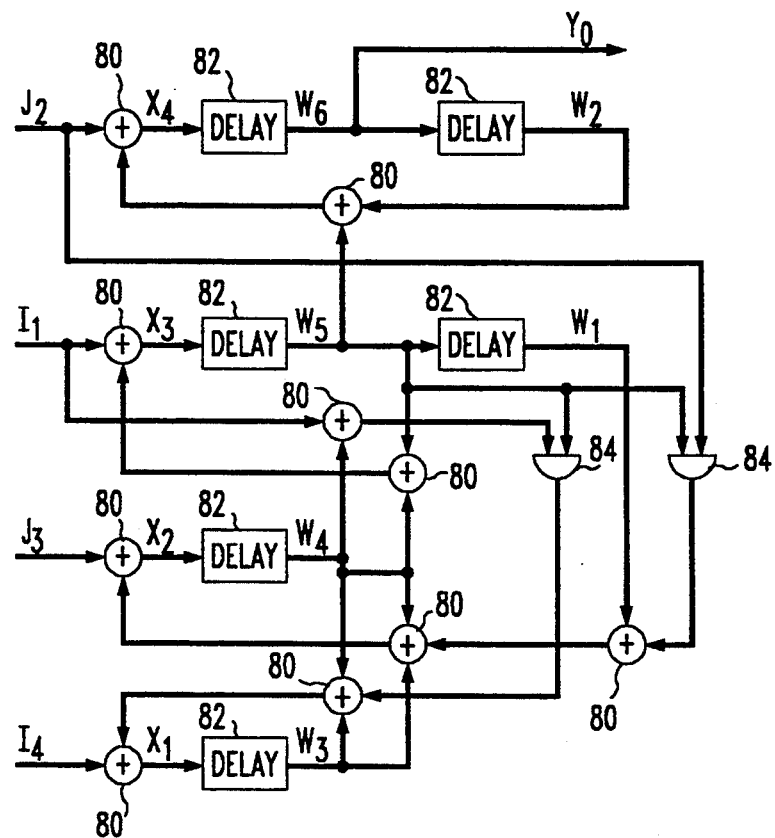
FIG. 5 illustrates a state machine with 64 states.
Figure 6:
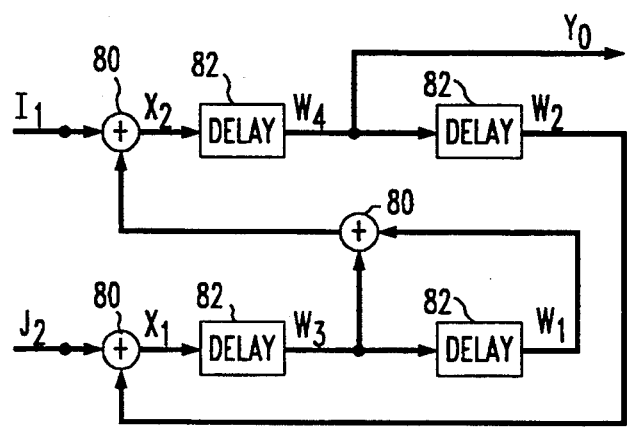
FIG. 6 illustrates a state machine with 16 states.

Bits $I_1,J_2,J_3,I_4$ and $I_5$ are fed to trellis encoder 50. Trellis encoder 50 is a finite state machine. These types of state machines art: well known in the art and two such state machines are shown in FIGS. 5 and 6. The state machine of FIG. 5 is a 64-state machine and the state machine of FIG. 6 is a 16-state machine. State machines with other numbers of states may be used. In the case of the 64-state machine, bits $J_2,I_1,J_3$ and $I_4$ are used as inputs. The outputs of the state machine are bits $Y_0-Y_5$, where bits $Y_1-Y_5$ equal bits $I_1$, $J_2$, $J_3,I_4$ and $I_5$, respectively. The devices labeled 80 are adders and the devices labeled 82 are delays. Bits $Y_0-Y_5$ are used to identify constellation subsets that are used with remaining bits $I_{n+1}-I_L$. The state machines of FIGS. 5 and 6 are used to output a new $Y_0$ bit every symbol period for two-dimensional trellis encoding, and every other symbol period for 4-dimensional encoding. If a new set of outputs is produced each symbol period, delay elements 82 act as a one-symbol period delay, and if a new output is produced every other symbol period, elements 82 act as two symbol period delays. When used to produce a new set of outputs $Y_0$ through $Y_5$ every two symbol periods, the selection of subsets is shown in Table 1 of FIG. 7. The Table illustrates which constellation subsets will be used during the two symbol periods. The first letter identifies the constellation subset used during the first symbol period, and the second letter identifies the constellation subset used during the second symbol period. (If two-dimensional encoding is used, only the first letter is used.) For example, if $Y_0$ through $Y_5$ equal 000010, bits $(I_{n+1}-I_L)_{k-1}$ will be encoded using constellation subset "a" and bits $(I_{n+1}-I_L)_k$ will be encoded using constellation subset "A".

If a constellation with a 4-way partition is used, the 16-state machine of FIG. 6 is used to produce bits $Y_0$-$Y_3$. In this case, n=3, where bits $Y_1$, $Y_2$ and $Y_3$ equal bits $I_1$, $J_2$ and $J_3$, respectively. Table 1 is used with $Y_4$ and $Y_5$ set equal to 0, and with lower and upper case forms of the same letter belonging to the same constellation subset.

It is also possible to practice the present invention without the use of the encoders of FIGS. 5 or 6. In this case, n=2 and bits $I_1$ and $I_2$ are fed to the differential encoder. The $J_2$ and $J_3$ bits from the differential encoder are used as bits $Y_2$ and $Y_3$. In this embodiment, two-dimensional coding is used and the differential encoder produces a new output for each symbol period. Table 1 is used with $Y_0$, $Y_1$, $Y_4$ and $Y_5$ set equal to 0, and with the second letter in each table entry ignored.

Returning to the case of an 8-way partitioned constellation, mappers 44a through 44d, and 46a through 46d, identify a symbol in constellation subsets a, b, c, d and A, B, C, D, respectively, based on bits $I_{n+1}$-$I_L$. The desired mapper output is selected using mux 48 which is controlled by trellis enhancer 52.

Trellis enhancer 52 substitutes the constellation subset identified by Table 1 and bits $Y_0$ through $Y_n$ (in this example n=5), based on the value of X-Cnt and Y-Cnt from modulo device 54. Table 2 of FIG. 8 illustrates the subset substitutions. Trellis enhancer 52 operates mux 48 in accordance with Table 2 so that the proper substitution occurs. The output of mux 48 is received by summer 58.

Before trellis enhancer 52 substitutes a constellation subset for the one identified by bits $Y_0$-$Y_n$, FIR filter 66 computes output p(k) based on its memory of past transmitted symbols (in the case of a 3-tap filter, the past three symbols). FIR filter 66 is a 3-tap filter that is well known in the art. Coefficients for the filter are obtained during training in a manner well known in the art. The output of the FIR filter is received by modulo device 54. Modulo device 54 performs a modulo operation on each of the orthogonal components of the symbol to produce a separate modulo count, X-Cnt and Y-Cnt, for the X and Y orthogonal components of filter 66's output. If the output of the FIR filter is positive and greater than $2^{-m}$ for a particular orthogonal component of p(k), then modulo value $2(2^{-m})$ is subtracted an integral number of times from that component of p(k) until the result is less than or equal to $2^{-m}$. The number of subtractions is counted by incrementing a respective x or y counter. If the output of the FIR filter is negative and less than or equal to $-2^{-m}$ for a particular orthogonal component of p(k), then modulo value $2(2^{-m})$ is added an integral number of times to that component of p(k) until the result is greater than or equal to $-2^{-m}$. The number of additions is counted by decrementing the respective x or y counter. The counters are arithmetic base 4; that is, decrementing two-bit value 00 by 1 produces two-bit value 11, and incrementing two-bit value 11 by 1 produces two-bit value 00. These counts are provided to trellis enhancer 52 via lines X-Cnt and Y-Cnt. The portion of signal p(k) that remains after these subtractions/additions is provided to summer 58 as signal d(k). Signal d(k) is called the dither signal. After performing these calculations, trellis enhancer 52 uses X-Cnt, Y-Cnt and bits $Y_0$ through $Y_n$ to substitute constellation subsets in accordance with Table 2. (For 4-way partitioned constellations, upper and lower case versions of the same letter are considered identical and only the first four columns of Table 2 are necessary.) The resulting output from mux 48 is sent to summer 58 where value d(k) is subtracted to produce signal x(k). This signal is provided to modulator 60, filter 62 and hybrid 64 in a conventional manner.

In reference to modulo device 54, the count of additions or subtractions is computed independently for each orthogonal axis of the output from filter 66. The counts can be maintained using arithmetic base 4 for 8-way partition constellations and arithmetic base 2 for 4-way partition constellations. These counts are used by the trellis enhancer 52 to perform the substitutions in accordance with Table 2.

When using large symbol constellations, a larger dither signal is tolerable because the larger dither signal reduces error propagation in the receiver's reconstruction filter. In order to accommodate a variety of constellations it may be desirable to use a variable modulo device. A variable modulo device performs similarly to modulo device 54 with the following differences. If the output of the FIR filter is positive and greater than $K2^{-m}$ for a particular orthogonal component of p(k), then modulo value $2K(2^{-m})$ is subtracted an integral number of times from that component of p(k) until the result is less than or equal to $K2^{-m}$. The number of subtractions is counted by incrementing a respective x or y counter K times the number of subtractions. If the output of the FIR filter is negative and less than or equal to $-K2^{-m}$ for a particular orthogonal component of p(k), then modulo value $2K(2^{-m})$ is added an integral number of times to that component of p(k) until the result is greater than or equal to $-K2^{-m}$. The number of additions is counted by decrementing the respective x or y counter K times the number of additions. The variable K is an integer that is greater than 1 for large constellations and equal to 1 for small constellations.

With regard to the value $2^{-m}$, and in reference to FIG. 4, the spacing between symbols is shown to be $2 \times 2^{-m}$. The value $2^{-m}$ is an arbitrary scaler where m is preferably an integer such as 7 or 8.

Figure 9:
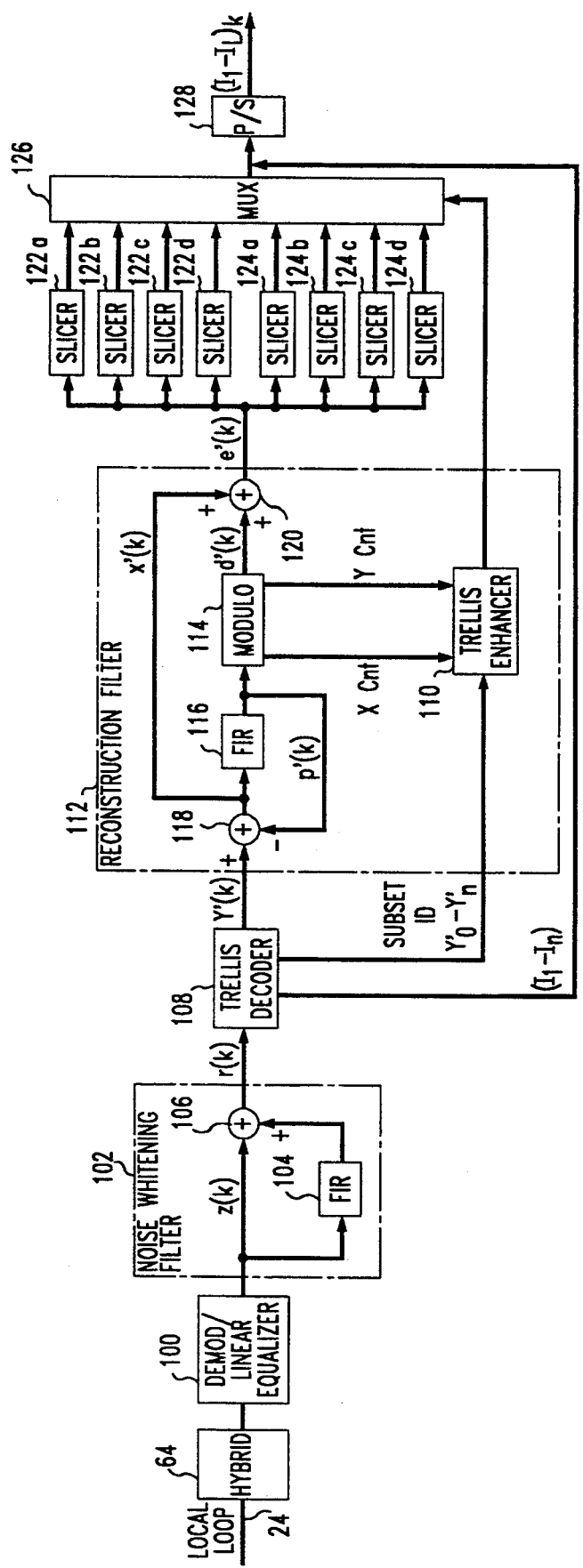
FIG. 9 illustrates the receiver section of one embodiment of the present invention.

FIG. 9 illustrates a receiver that is used with the present invention. A signal is received from local loop 24 through hybrid 64. The receive signal then passes through demodulator/linear equalizer 100, which is well known in the industry. The signal then passes into noise whitening filter 102. Noise whitening filter 102 compensates for colored noise that is introduced by the communication channel. It is desirable to have white noise so that the trellis code can be successfully decoded. Noise whitening filter 102 comprises three-tap FIR filter 104 and summer 106. FIR filter 104 is well known in the industry and has the same tap values as FIR filter 66 in the remote transmitter of FIG. 3. The whitened signal r(k) is fed to trellis decoder 108. Trellis decoder 108 executes the well known Viterbi algorithm to recover the trellis code and bits $I_1$–$I_n$. The recovered trellis code is used to identify the transmitted constellation subset. This information is supplied to enhancement unit 110 of reconstruction filter 112. Trellis enhancement unit 110 also receives the X-Cnt and Y-Cnt outputs of modulo device 114.

The output of trellis decoder 108 is signal Y'(k) and represents a signal having an expanded number of symbols or signal points that extend beyond the constellation of FIG. 4. Constellation expansion is a result of noise whitening filter 102 and its complementary filter and modulo device in the remote transmitter. To eliminate this expansion, FIR filter 116 and summer 118 operate to perform the inverse of noise whitening filter 102. The coefficients of 3 tap FIR filter 116 are the same as FIR filters 104 and 66 in the remote transmitter. The output of FIR filter 116 is labeled p'(k) and is fed to modulo device 114. Modulo device 114 operates in the same manner as the remote modulo device 54. As was described with regard to modulo device 54, modulo device 114 produces signals X-Cnt and Y-Cnt. The output of modulo device 114 is signal d'(k) which is an estimate of signal d(k). Signal d'(k) is combined with signal x'(k) from summer 118 in summer 120. The output of summer 120 is signal e'(k). The output of summer 120 is fed to slicers 122a, b, c and d, and slicers 124a, b, c and d. Slicers 122a, b, c and d and slicers 124a, b, c and d are used to determine which symbol of constellation subsets a, b, c, d, and A, B, C and D, respectively, are represented by signal e'(k). Mux 126 is used to select the output of one of the aforementioned slicers. Mux 126 is controlled using trellis enhancement unit 110. Trellis enhancement unit 110 uses the bits $Y'_0$–$Y'_n$ to identify the transmitted constellation subset, and inputs X-Cnt and Y-Cnt of modulo device 114 are used in accordance with Table 2 to identify the original constellation subset that was replaced with the transmitted subset. Once the original subset has been identified, the slicer associated with that subset is selected using mux 126. The output of mux 126 is then fed to parallel-to-serial converter 128 to recover the originally provided data stream.

Figure 10:
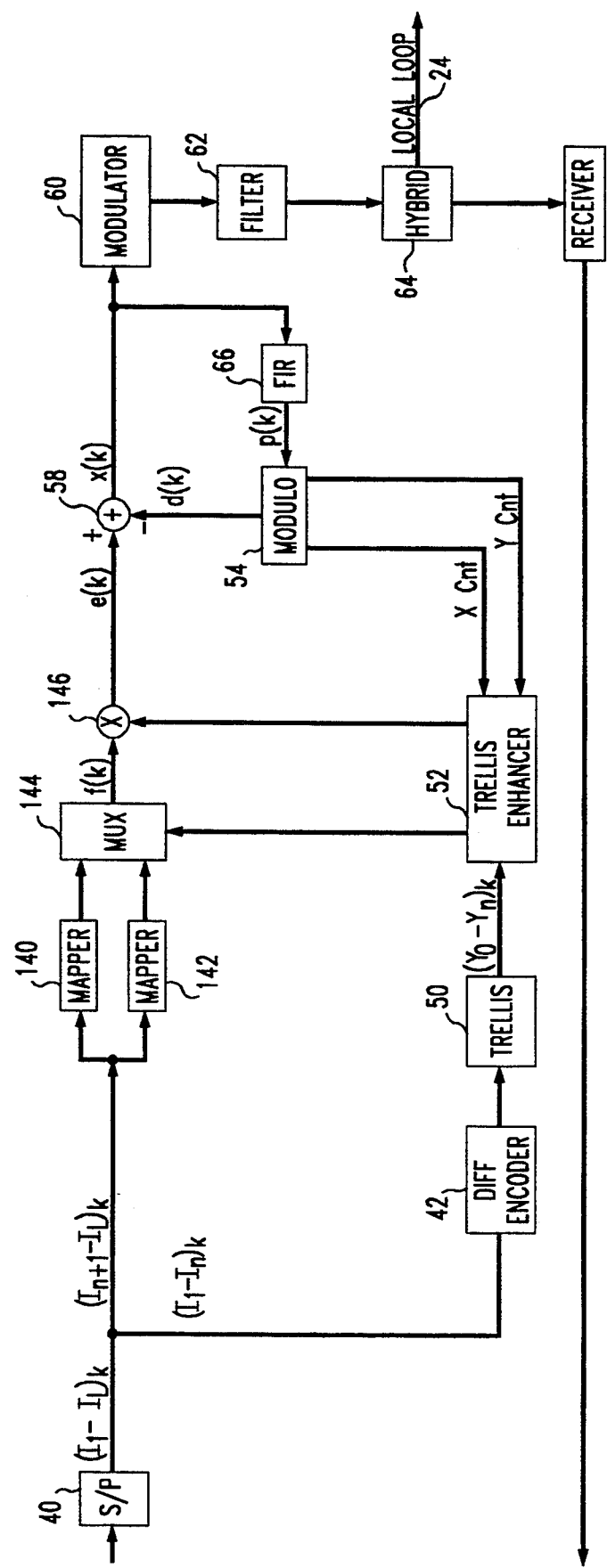
FIG. 10 illustrates the transmitter section of another embodiment of the present invention.

FIG. 10 illustrates an alternative embodiment for selecting substitute constellation subsets in the transmitter. In this embodiment mappers 44a, b, c, d and 46a, b, c, d are replaced with mappers 140 and 142. Each mapper maps signal containing bits $I_{n+1}$ to $I_L$ into a constellation subset. In this embodiment, there are eight constellation subsets that are grouped into two groups of four. In each group of four, the constellation subsets are rotationally related to each other by 90 degree phase shifts. As a result, by selecting the output of mapper 140 or 142, mux 144 selects one of the two groups of four subsets. A particular subset within a group of four is selected through the use of multiplier/rotator 146. The subset from mux 144 can be rotated by 0, 90, 180 or 270 degrees to produce any one of the four subsets associated with each mapper. As a result, trellis enhancement device 52 has two outputs, one output selects between mapper 140 and 142 using mux 144, and the other output indicates to multiplier/rotator 146 that a 0, 90, 180 or 270 degree rotation should be initiated. This operation provides the advantage of using a smaller number of mappers as compared to the embodiment of FIG. 3.

Figure 11:
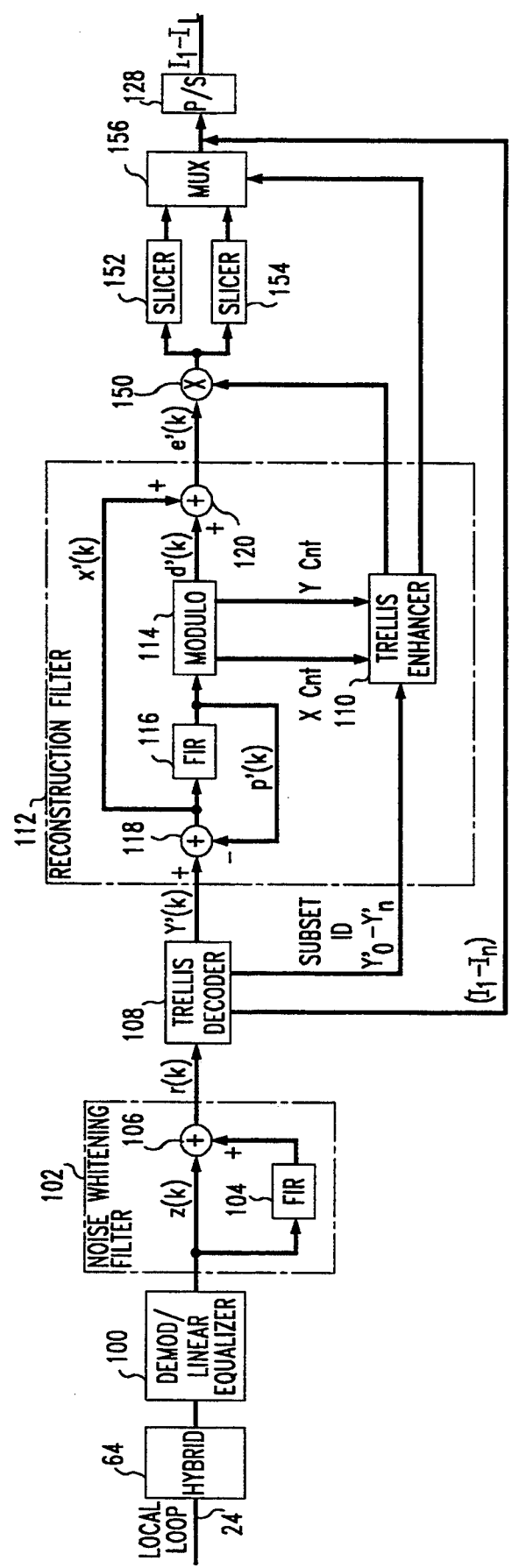
FIG. 11 illustrate the receiver section of another embodiment of the present invention.

In a similar manner, FIG. 11 illustrates an alternative embodiment of the receiver shown in FIG. 9. Signal e'(k) is received by multiplier/rotator 150, the output of multiplier/rotator 150 is fed to slicers 152 and 154. The output of slicers 152 and 154 are selected using mux 156. Trellis enhancement unit 110 provides inputs to multiplier/rotator 150 and mux 156. As discussed with regard to FIG. 9, trellis enhancement unit 110 uses the received subset identity from trellis decoder 108, and the X-Cnt and Y-Cnt inputs from modulo device 114 to identify the original constellation subset. As discussed with regard to FIG. 10, multiplier/rotator 150 is used to rotate the received symbol by 0, 90, 180 or 270 degrees to reverse the effect of multiplier/rotator 146. Mux 156 is used to pick the appropriate slicer output to recover the original data.

Figure 12:
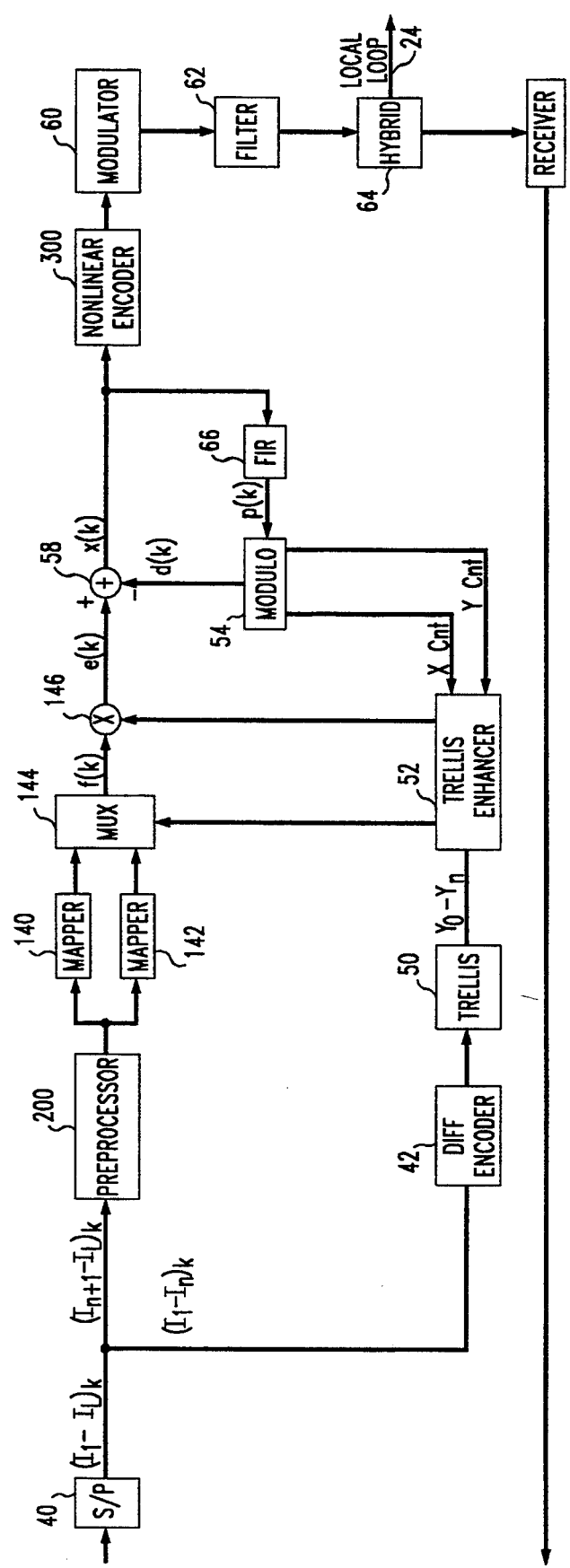
FIG. 12 illustrates the transmitter section of the present invention with a non-linear encoder.
Figure 13:
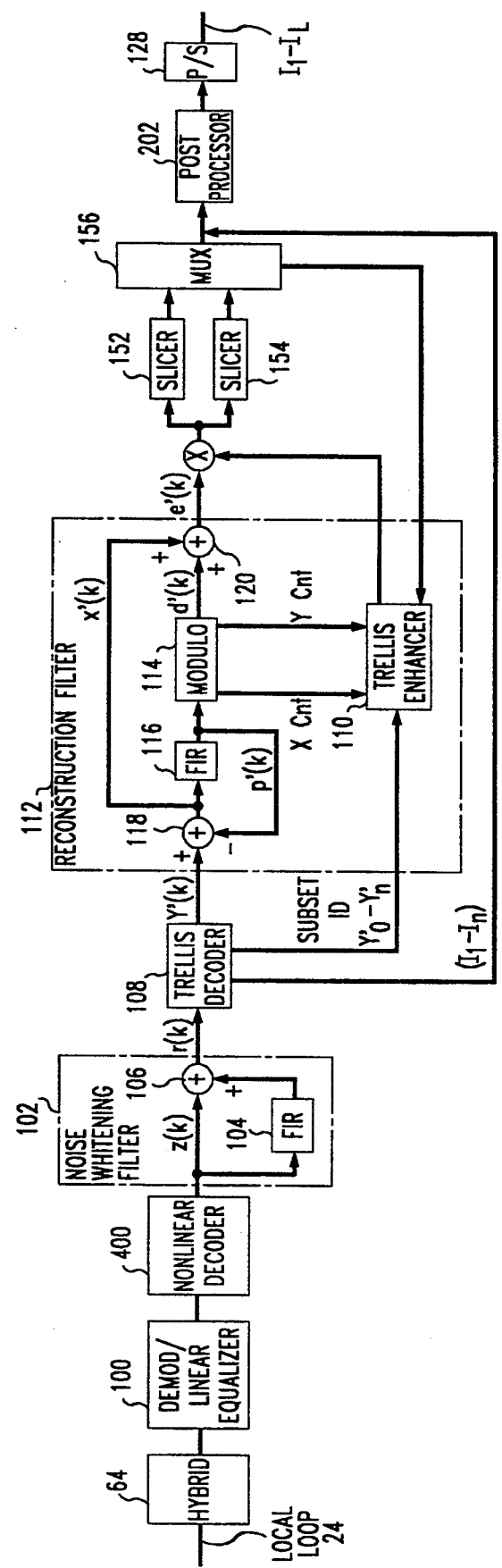
FIG. 13 illustrates the receiver section of the present invention with a non-linear decoder.

FIGS. 12 and 13 illustrate another embodiment of the present invention. With regard to FIG. 12, the transmitter is modified by placing preprocessing unit 200 between serial-to-parallel converter 40, and mappers 140 and 142. The processor can be used to perform functions such as fractional rate encoding, modulus conversion, shaping by rings, and constellation switching. Additionally, the output of summer 58 is fed to non-linear encoder 300 before being passed to modulator 60.

With regard to FIG. 13, the receiver has been modified to include non-linear decoder 400 between demodulator/linear equalizer 100 and noise whitening filter 102. Non-linear decoder 400 compensates for the action of non-linear encoder 300. In addition, post-processing unit 202 is placed between mux 156 and parallel-to-serial converter 128. Post-processing unit 202 forms the inverse of preprocessing unit 200.

The non-linear encoder compensates for non-linear characteristics of the transmission channel. The non-linear encoder warps the constellation by adjusting the positions of its signal points in accordance with a warp function which models the inverse of that component of the non-linear characteristic of the transmission channel which is known a priori. In the case of a PCM system, for example, that component is typically a logarithmic function of the magnitude of the signal being transmitted-the so-called $\mu$-law characteristic. Thus, an inverse logarithmic function, i.e., an exponential function, of the magnitude of the transmitted signal is used to warp the constellation.

Because the constellation warping is deterministic, it is possible for the receiver to "unwarp" the received signal points prior to applying them to the Viterbi decoder using the inverse of the warp function and thereby modeling the known non-linear component of the channel characteristic. (In the case of a PCM system, the inverse function is the inverse of the $\mu$-law characteristic and is, more particularly, a logarithmic function.) As a result, the Viterbi decoder can use the standard, unmodified Viterbi decoding algorithm.

Figure 14:
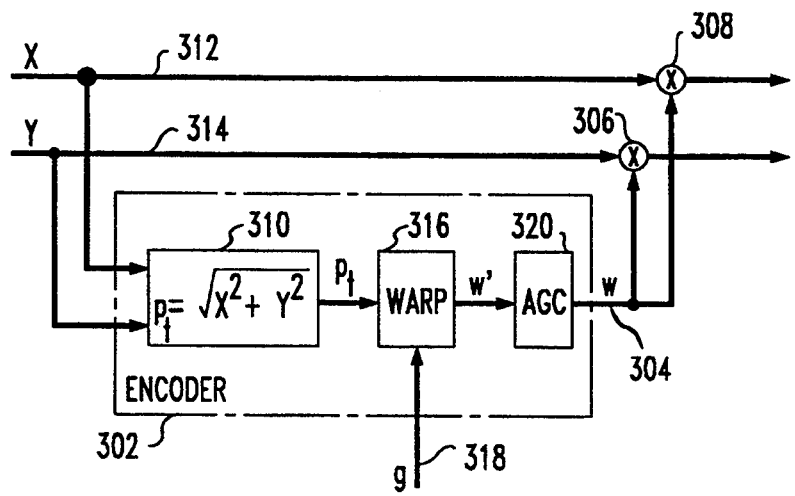
FIG. 14 is a block diagram of the non-linear encoder.

In reference to FIG. 14, the X and Y orthogonal values in signal x(k) are warped by being multiplied by a warp multiplier w generated in accordance with a selected warp function. Specifically, the warp multiplier is generated by encoder 302, which provides it on lead 304 to multipliers 306 and 308. The latter carry out the aforementioned multiplication and the resulting warped values are applied to modulator 60 which, in standard fashion, generates a modulated line signal representing the stream of warped signal points.

It is presumed that the communication channel includes a PCM system so that the overall channel characteristic has a known non-linear component which is a function of instantaneous signal magnitude, that function being the $\mu$-law characteristic. Accordingly, the warp function used by encoder 302 to generate warp multiplier w is a function of the signal magnitude of the transmitted signal points. That is, the magnitude is an independent variable in the warp function. To this end, encoder 302 includes magnitude computer 310, which receives the X and Y values from leads 312 and 314 and determines the magnitude $P_t$ of each signal point by computing the value $p_t = \sqrt{X^2Y^2}$. That value of $p_t$ is then applied to warp generator 316, which receives a warp factor g on lead 318 from within the modem or communication device. This factor-which is another independent variable in the warp function—is selected as a function of the degree to which it is desired to warp the overall signal constellation which, in turn, is a function of the known component of the non-linear characteristic of the channel—in this case, the $\mu$-law characteristic. In the present illustrative embodiment, warp generator 316 generates a preliminary warp multiplier w' in accordance with the warp function $$w' = 1 + (8192P_t + 2731P_t^2 + 683P_t^3 + 137P_t^4 + 23P_t^5 + 3P_t^6)/16384$$

where $P_t = p_t/g$.

This relation is a series approximation to the (exponential) inverse of the $\mu$-law characteristic $$w = \frac{e^{P_t} - 1}{P_t}$$

Moreover, where a different non-linear relationship obtains in the channel, a different inverse of that function would be used by warp generator 316. For example, if the channel includes an ADPCM system, where the signal processing algorithm changes over time, as a function of signal magnitude, then the value of g used by warp generator 316 would be adapted in such a way as to model the inverse of that algorithm. The function used by the warp generator could also take into account how one expects noise in the channel to differently affect low- and high-magnitude signal points of the constellation.

Depending on the value of warp factor g and the range of values for $p_t$, it may be the case that multiplying preliminary warp multiplier w' by X and Y would result in warped signal points that cause the peak and-/or average power limits of the channel to be exceeded. Accordingly, preliminary warp multiplier w' is processed within encoder 302 by automatic gain control (AGC) 320 to generate the aforementioned warp multiplier w on lead 304. The AGC has a very long time constant, thereby providing a scaling function which, after an adaptation period, will be essentially constant for any given constellation and warp factor g. This serves to impose an upper limit on the value of warp multiplier w which avoids any exceeding of the channel power limits.

Figure 15:
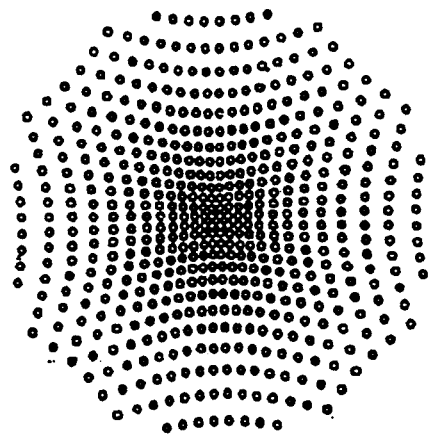
FIGS. 15-17 illustrate warped constellations with different values for g.
Figure 16:
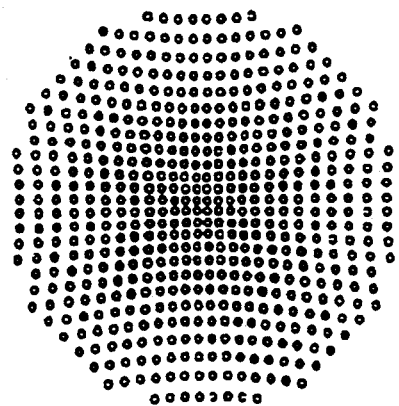
Figure 17:
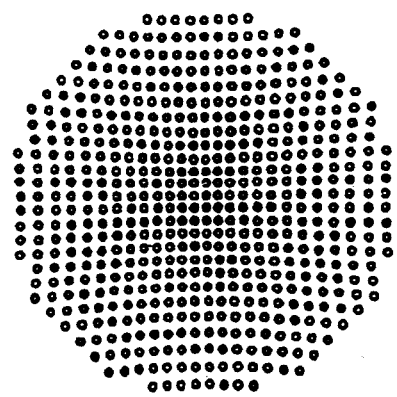
Figure 18:
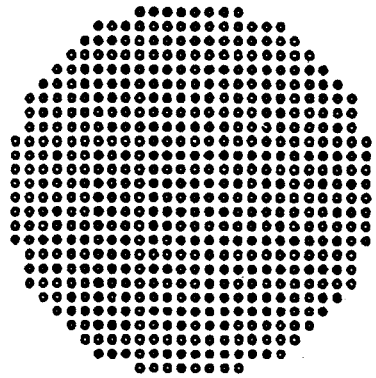
FIG. 18 illustrates an unwarped constellation.

FIGS. 15–17 show the warped versions of the constellation of FIG. 18 that result from the warping just described using different values of warp factor g. The particular value of warp factor g that is used will depend on the application and may be determined empirically. In any case, it will be appreciated that each of the warped signal points of the constellation of FIGS. 15–17 are related to a respective signal point of the base constellation of FIG. 18 in accordance with a predetermined warp function.

Figure 19:
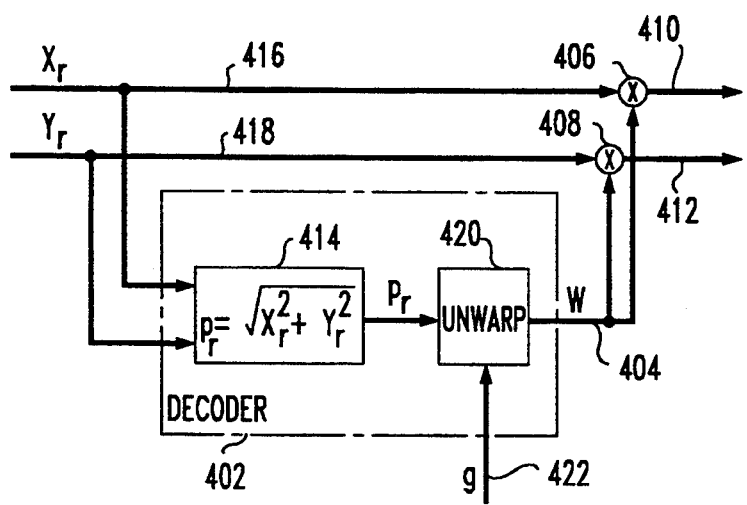
FIG. 19 is a block diagram of the non-linear decoder.

Turning, now, to the receiver of FIG. 13, and in reference to FIG. 19, the signal from demodulator/linear equalizer 100 represents the demodulator-/equalizer's best estimate of the in-phase and quadrature-phase components of the transmitted signal points, designated $X_r$ and $Y_r$, the subscript "r" denoting "receiver." These components are "unwarped," by non-linear decoder 400 by multiplying them by an unwarping multiplier W. Specifically, that multiplier is generated by decoder 402, which provides multiplier W on lead 404 to multipliers 406 and 408 in a manner described below. Multipliers 406 and 408 carry out the aforementioned multiplication, and the resulting unwarped in-phase and quadrature-phase values on leads 410 and 412 are applied to noise whitening filter 102.

Referring to decoder 402, its job is to determine the value of $p_r$ of the received signal points and, armed with a knowledge of the value of warp factor g, to perform the inverse of the warping that was undertaken in the transmitter. Thus, decoder 402 includes magnitude computer 414, which computes the value of $p_r$ from the received $X_r$ and $Y_r$ values on leads 416 and 418, and unwarp generator 420 which, responsive to the value of warp factor g on lead 422, generates unwarp multiplier W in accordance with the relation $$W = 1 + (-8192P_r + 5461P_r^2 - 4096P_r^3 + 3277P_4^4 - 2731P_r^5 + 2341P_r^6)/16384$$

where $P_r = p_r/g$.

This is the inverse of the relation by which preliminary warp multiplier w' was generated and is a series approximation—usable for $P_r < 1$—to the (logarithmic) $\mu$-law characteristic $$W = \frac{\ln(1 + P_r)}{P_r}.$$

For $P_r \geq 1$, a different approximation would be used.

Note that the value of the magnitude $p_r$ that is used in the expression for unwarp multiplier W is the value computed from the received signal points. This value of $p_r$ will typically be at least a little different from the value used to generate warp multiplier w in the transmitter owing to the noise component superimposed on the received signal points. This means that the amount by which a point is unwarped will be slightly different than the amount by which it was warped. Advantageously, however, this difference will tend to bring the signal points, upon being unwarped, into tighter loci about their corresponding positions in the base constellation than if, for example, the unwarping were to be carried out employing the value of $p_t$ used in the transmitter (assuming that value could, in fact, be made known to, or could be computed in, the receiver).

The foregoing relates to noise that was superimposed on the transmitted signal points after the $\mu$-law encoding in the channel has been carried out. However, at the point in time that they are subjected to the $\mu$-law encoding in the channel, the transmitted signal points have already been somewhat perturbed due to noise and other channel effects occurring between the transmitter and the codec within the channel in which the $\mu$-law encoding is actually carried out. Thus the warped signal points are not warped from the ideal signal point positions of FIG. 18, but rather from positions that are just a little bit displaced therefrom. Using the inverse of the $\mu$-law characteristic in the receiver does not take account of this. The effect is very minor, so that the approach described hereinabove does work quite well. It is, however, possible to take account of that effect, thereby providing results that are even better.

In particular, it is known that, in the absence of warping, the noise associated with each received signal point—due to the non-linear A/D converter in a PCM system-may be closely represented by an equation of the form $$n = \sqrt{a^2 p^2 + b^2}$$

where n is the root-mean-square (r.m.s.) value of the noise associated with a signal point of magnitude p. The constants a and b depend upon the properties of the communication channel and the transmit and receive filters.

In situations, such as that postulated here, in which the transmission channel superimposes multiplicative noise onto the received signal points, it is advantageous for the warp function and its inverse to be such that, upon warping, the distance between adjacent signal points is proportional to the r.m.s. noise associated with those points. As a result, the noise superimposed on each received signal point is independent of its position in the constellation and the difference of error probabilities associated with different signal points is minimized. If the constellation contains a large number of signal points, this property is achieved by a warp function $$w' = 1 + \frac{P_t^2}{6} + \frac{P_t^4}{120}$$

where $P_t = p_t/g$ and $g = b/a$. An alternative expression which provides good performance is $$P_t^2 = C p_t^2$$

where $C = 0.4/(\overline{X^2 + Y^2})$ and $(\overline{X^2 + Y^2})$ is the average power of the signal input to the nonlinear encoder.

This relation is a series approximation to a hyperbolic sine function $$w = \frac{\sinh P_t}{P_t}.$$

Note, the new modem standard V.34, previously known as V.fast, may use $$C = 0.3125/(\overline{X^2 + Y^2}).$$

Since the value of a and b are dependent on the communication channel and are generally not known a priori, g may be adapted as before, or may be calculated from measurement of the received noise so as to determine the ratio b/a.

The corresponding receiver unwarp multiplier is generated according to the relation $$W = 1 + (-2731 P_r^2 + 1229 P_r^4 - 731 P_r^6 + 264 P_r^8)/163-84$$

which is a series approximation to the inverse hyperbolic sine function $$W = \frac{\ln(P_r + \sqrt{1 + P_r^2})}{P_r} = \frac{\sinh^{-1} P_r}{P_r}$$

valid for $P_r < 1$.

After the unwarping operation is carried out, the original constellation with equal spacing of signal points is approximately restored, with approximately equal noise power associated with each signal point.

The foregoing merely illustrates the principles of non-linear encoding/decoding. Thus, although logarithmic and sinh functions are discussed herein, other functions may be advantageous in particular circumstances.

In a simple implementation, warp factor g can be pre-set in the transmitter and receiver based on the expected characteristics of the channel. In a more sophisticated application, one might adaptively determine g by having the receiver examine the dispersion of the received signal points about the expected signal points and then use that measurement to adapt the value of g in the receiver while making that value known to the transmitter via, for example, conventional diagnostic channel communications between the two modems or communication devices.

Figure 20:
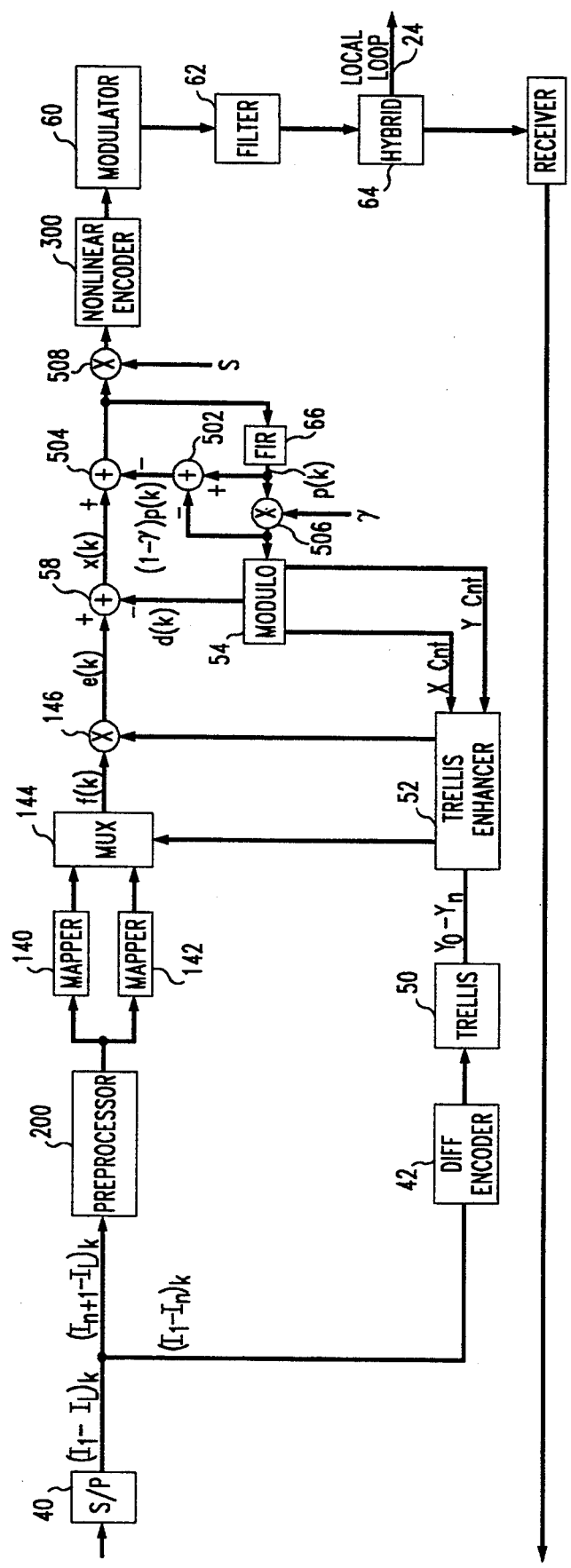
FIG. 20 illustrates a transmitter where the amount of precoding and preemphasis is adjustable.

FIG. 20 illustrates an embodiment of the invention where the amount of precoding and preemphasis provided to a transmitted signal is dynamically adjustable. FIG. 20 is similar to FIG. 12 except that adders 502 and 504 have been included to provide a means for adding preemphasis to the signal, and multiplier 506 has been added to control the relative amounts of precoding and preemphasis provided to the transmitted signal. Multiplier 508 has also been added to provide constellation power scaling, S, which controls the magnitude of the signal that is presented to non-linear encoder 300 so that the signal presented at local loop 24 falls within specified levels.

The relative amounts of precoding preemphasis are controlled using multiplier 506 and scaler $\gamma$. In this case, $\gamma$ varies between 0 and 1. When $\gamma$ is set equal to 0, the amount of precoding provided to the transmitted signal is minimized and the amount preemphasis is maximized. When $\gamma$ is set equal to 1, the amount of precoding is maximized and the amount of preemphasis is minimized.

The output of filter 66, p(k), is multiplied by $\gamma$ using multiplier 506. The output of multiplier 506 is provided to modulo device 54 which is used to produce signal d(k) which is summed with signal e(k) in summer 58. As a result, when $\gamma$ is set equal to 1, maximum precoding is provided, and when $\gamma$ is set equal to 0, signal d(k) is driven to 0 and no precoding is provided.

The output of multiplier 506 is also provided to summer 502. Summer 502 combines sums the output of multiplier 506 and the output of filter 66. As a result, the output of summer 502 equals $(1-\gamma)p(k)$. The signal from summer 502 is a preemphasis signal that is combined with signal x(k) in summer 504. This method provides better resolution than simply multiplying p(k) by scaler $(1-\gamma)$. When $\gamma$ is set equal to 1, the signal at the output of summer 502 is equal to 0 and thereby eliminates preemphasis, and when $\gamma$ is set equal to 0, the signal at the output of summer 502 is equal to signal p(k) thereby maximizes preemphasis.

Figure 23:
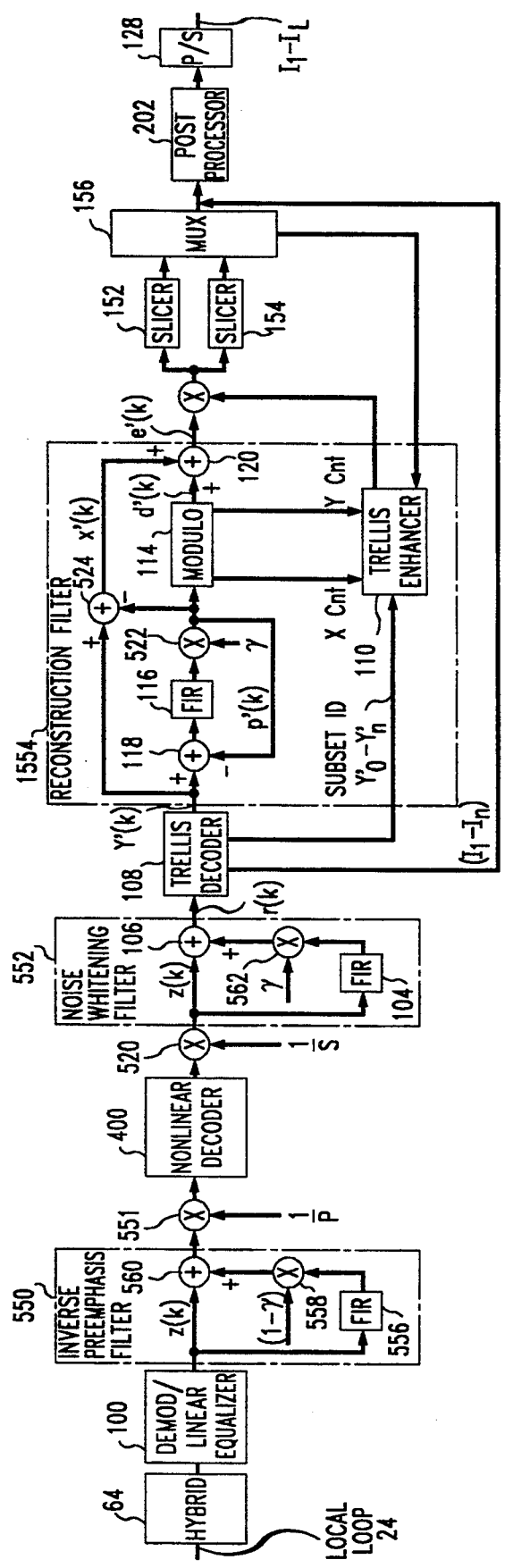
FIG. 23 illustrates the receiver that corresponds to the transmitter of FIG. 22.

The value of $\gamma$ may vary from 1 to 0; however, other values may be used when an inverse preemphasis filter and a noise whitening filter are used in a configuration such as shown in FIG. 23. The value of $\gamma$ should be set based on the relative amounts of additive white noise and proportional noise in the receive signal. The amount of noise may be monitored as data is transferred over the communication channel. After a slicer or similar device identifies, which of the constellation's signal points is specified by the received signal, the amount of noise that was received with that signal point is measured. The noise is measured by determining the error signal which is the distance between the received signal point and the identified signal point. The amount of noise associated with signal points corresponding to smaller amplitude signals is compared with the amount of noise associated with signal points corresponding to larger amplitude signals. When the amount of noise associated with smaller and larger amplitude signals is approximately equal, most of the noise in the channel is additive white noise, and therefore, transmit signals should receive a maximum amount of precoding while receiving a minimum amount of preemphasis. This is carded out by setting the value of $\gamma$ equal to 1. If the amount of noise associated with smaller amplitude signals is much less than the amount of noise associated with larger amplitude signals, the noise added by a communication channel can be characterized as proportional noise. When there is a great deal of proportional noise, it is desirable to maximize preemphasis while minimizing precoding. In this situation, the value of $\gamma$ is set equal to 0 so that pre-coding is minimized while preemphasis is maximized. It is also possible to deal with in-between situations where there is additive white noise and some proportional noise. These situations are addressed by setting $\gamma$ equal to a value that is somewhere between 1 and 0. For example, the value of $\gamma$ should be closer to 1 when there is larger amounts of additive white noise, and the value of $\gamma$ should be closer to 0 when there are larger amounts of proportional noise. When the amounts of additive white noise and proportional noise are approximately equal, the value of $\gamma$ may be set to 0.5.

The value of $\gamma$ may be changed without retraining. For different values of $\gamma$ the coefficients of the FIR filters in the transmitter and receiver may remain the same. When the value of $\gamma$ is changed, the new value of $\gamma$ is communicated between the transmitting and receiving communication devices using a secondary channel such as a diagnostic channel or other conventional secondary channel. It should be noted that changing the value of $\gamma$ may cause a temporary loss in data; however, the change will not result in a loss of synchronization between the devices. This is important because protocols for devices such as modems call for retraining when synchronization is lost. Maintaining synchronization provided a more efficient transfer of data because time is not wasted in detecting a loss of synchronization, and additional time is not wasted to retraining the transmitting and receiving devices after a loss of synchronization.

Figure 21:
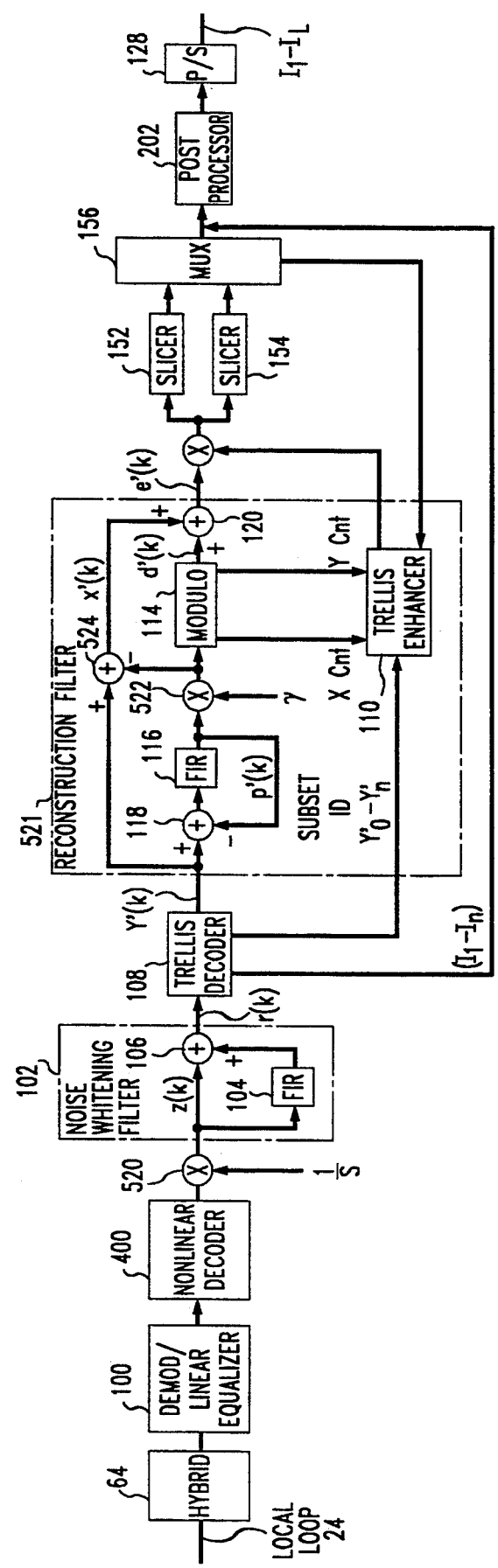
FIG. 21 illustrates the receiver that corresponds to the transmitter of FIG. 20.

FIG. 21 illustrates the receiver that corresponds to the transmitter of FIG. 20. The receiver of FIG. 21 is similar to the receiver of FIG. 13 except that multiplier 520 is provided to reverse the effects of multiplier 508 in the transmitter of FIG. 20. In addition, reconstruction filter 1554 includes multiplier 522 and summer 524. The value of $\gamma$ used as an input to multiplier 522 is the same value of $\gamma$ that is used in the transmitting device. The input to multiplier 522 is received from filter 116. The output of multiplier 522 is provided to modulo device 114 and summer 524. Summer 524 sums the output of multiplier 522 and the signal from trellis decoder 108. The output of summer 524 is provided to summer 120.

When $\gamma$ is equal to 1, the receiver operates to recover the transmitted data where the transmit signal was precoded with no preemphasis. When $\gamma$ is set equal to 0, the receiver operates to recover data from a signal that has no precoding and maximum preemphasis. As was discussed with regard to the transmitter, $\gamma$ can also be set at values from 1 to 0. The value of $\gamma$ in the transmitting device should be equal to the value of $\gamma$ in the receiving device. The value of the coefficients used by FIR of the receiving device are the same values in the FIR filter of the transmitting device.

The output of the scaling multipliers in both the transmitting and receiving devices should be rounded off symmetrically to maintain rotational invariance; (immunity to phase rotations produced by the communication channel). The outputs of the scaling multipliers are rounded off symmetrically in the case of a negative product, by inverting the product, rounding the product and inverting again to recover the original sign. In the case of a positive product, the product is simply rounded.

Figure 22:
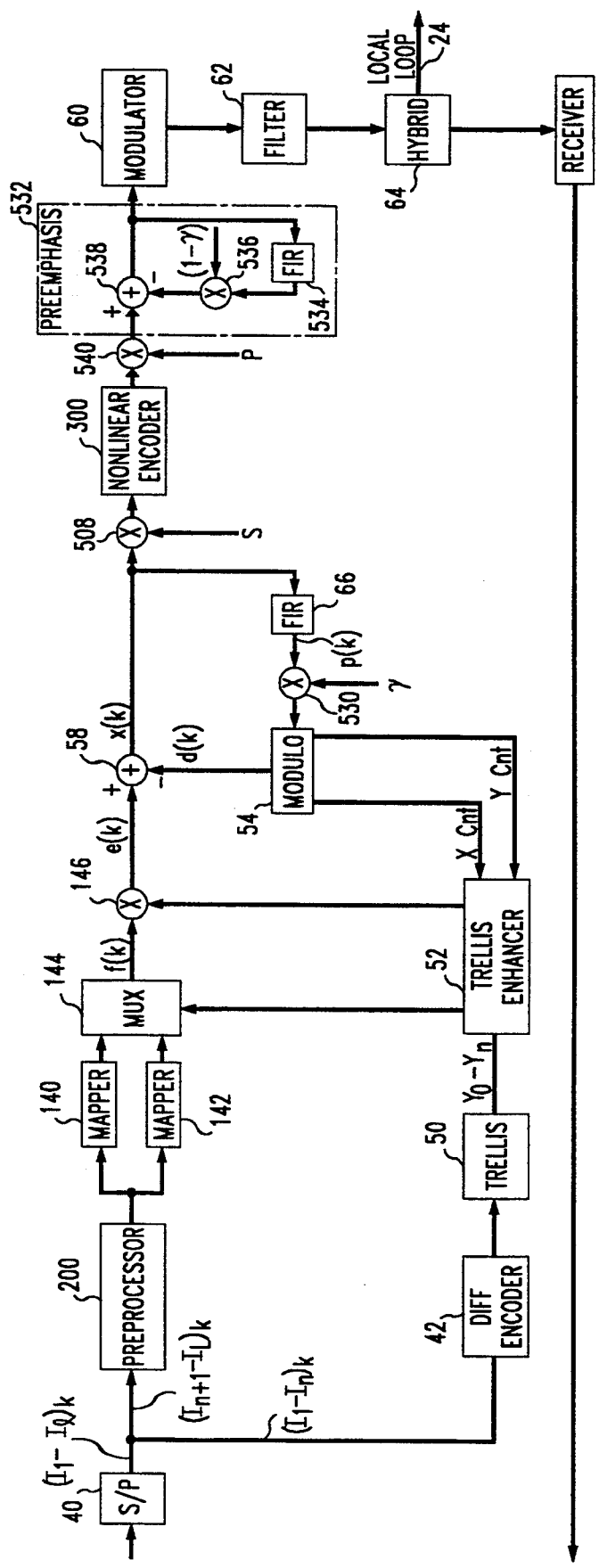
FIG. 22 illustrates another embodiment of the transmitter of FIG. 20.

FIG. 22 illustrates another embodiment of the transmitter of FIG. 20. In this embodiment, the amount of precoding is controlled by multiplier 530 which multiplies the output of filter 66 by $\gamma$. In this case, the preemphasis is provided by pre-emphasis unit 532 which is positioned between non-linear encoder 300 and modulator 60. Pre-emphasis device 532 includes FIR filter 534, multiplier 536 and summer 538. The input to preemphasis device 532 is scaled using multiplier 540 to provide preemphasis power scaling. The magnitude of the power scaling is P. Preemphasis power scaling compensates for any variation in gain introduced by preemphasis device 532. The total gain provided by multiplier 540 and preemphasis device 532 is equal to one.

With regard to preemphasis device 532, filter 534 uses the same taps or coefficients as filter 66. The output of filter 534 is received by multiplier 536 which multiplies the output of filter 534 by $1-\gamma$. The output of multiplier 536 is received by the summer of 538 that sums the signal from multiplier 536 with the signal from multiplier 540. The output of summer 538 is received by modulator 60.

As was discussed with regard to FIG. 20, the value of $\gamma$ is varied to control the amount of precoding and preemphasis. When $\gamma$ is set equal to 1, the output of multiplier 530 is equal to the output of filter 66 and thereby provides maximum precoding while no preemphasis is provided because the output of multiplier 536 is 0 when $\gamma$ is equal to 1. When maximum preemphasis is desired and minimum precoding is desired, $\gamma$ is set equal to 0. Setting $\gamma$ equal to 0 sets the output of multiplier 530 equal to 0 and thereby disables precoding. Setting $\gamma$ equal to 0 sets the output of multiplier 536 equal to the output of filter 534 and thereby provides maximum preemphasis through the action of summer 538.

FIG. 23 illustrates the receiver associated with the transmitter of FIG. 22. The output of demodulator/linear equalizer 100 is received by inverse preemphasis device 550. The output of inverse preemphasis device 550 is received by multiplier 551 which compensates for multiplier 540 of FIG. 22. The output of nonlinear decoder 400 is received by multiplier 520 which provides an input to noise whitening filter 552. The output of noise-whitening filter 552 is received by trellis decoder 108, and the output of trellis decoder 108 is received by reconstruction filter 1554. The remaining portions of the receiver are similar to the receiver of FIG. 13.

Inverse preemphasis device 550 includes filter 556, multiplier 558 and summer 560. Filter 556 is the same type of filter with the same value for its coefficients or taps as the FIR filters of FIG. 21 and FIG. 12. The output of filter 556 is received by multiplier 558 which multiplies the filter's output by a value of $1-\gamma$. The output of multiplier 558 is receiver by summer 560 which sums the input to inverse preemphasis device 550 with the output of multiplier 558. The output of summer 560 is received by multiplier 551 which forms the inverse of the scaling action carried out by multiplier 540 in the transmitter. After passing through nonlinear decoder 400 and multiplier 520, the signal enters noise whitening filter 552. Noise whitening filter 552 is similar to noise whitening filter 102 of FIG. 13 except that it includes multiplier 562. Multiplier 562 multiplies the output of filter 104 by $\gamma$ and provides the product to the input of summer 106. The output of summer 106 is provided to trellis decoder 108 which provides its output to reconstruction filter 1554.

As was discussed with regard to FIG. 21, when $\gamma$ is equal to 1, the receiver acts to recover a signal that has no preemphasis and maximum precoding. This can be seen at the output of multiplier 558 which is equal to 0 when $\gamma$ equals 1 and thereby disables inverse preemphasis device 550. In addition, the outputs of filters 104 and 116 are multiplied by 1 when $\gamma=1$ and thereby enables noise whitening filter 552 and reconstruction filter 1554. When $\gamma$ is equal to 0, the receiver acts to recover a signal that has no precoding and maximum preemphasis. When $\gamma$ is equal to 0, the output of multiplier 558 is equal to the output of filter 556 so as to enable inverse preemphasis device 550. It should also be noted that noise whitening filter 552 is disabled when $\gamma=0$ because the output of multiplier 562 sets one input of summer 106 equal to 0. As was discussed with regard to reconstruction filter 1554, the output of multiplier 522 is 0 when $\gamma$ equals 0. This results in $e'(k)=Y'(k)$ which removes the reconstruction filter. Note that in reconstruction filter 1554 the feedback signal $p'(k)$ is generated by multiplier 522.

Figure 24:
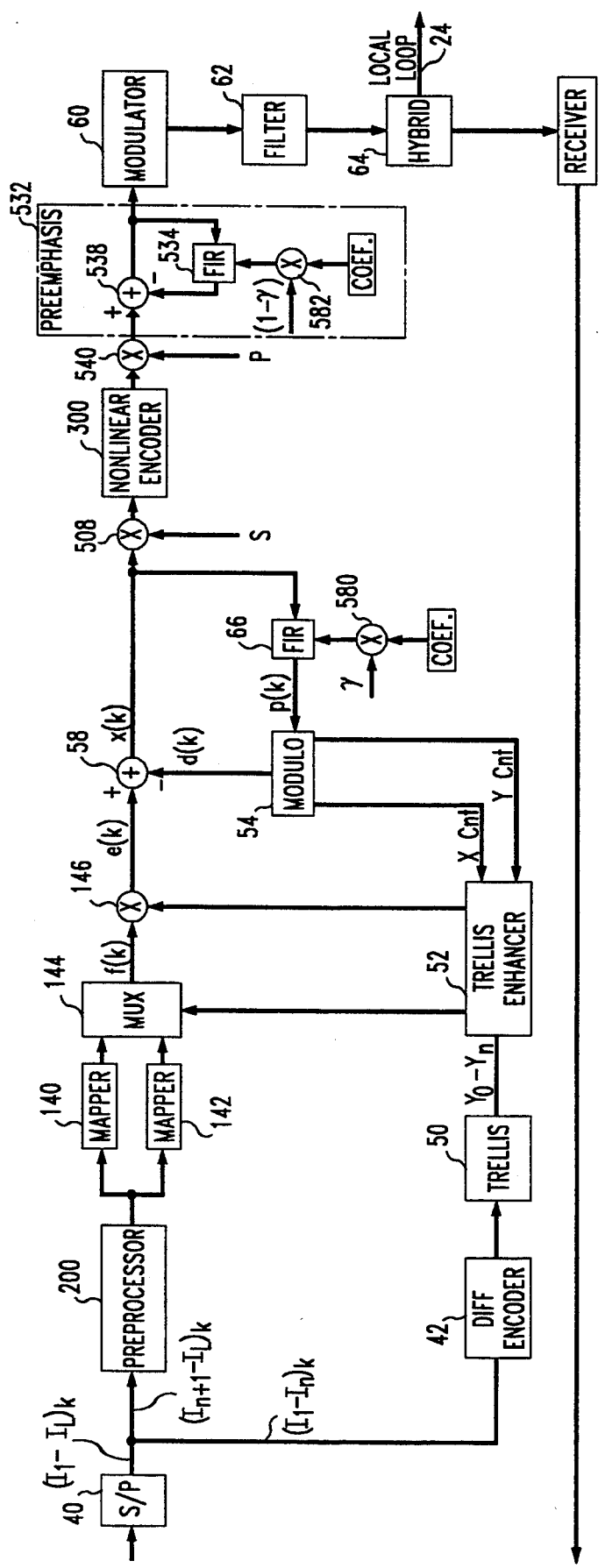
FIG. 24 illustrates the embodiment of FIG. 22 with scaled filter coefficients.
Figure 25:
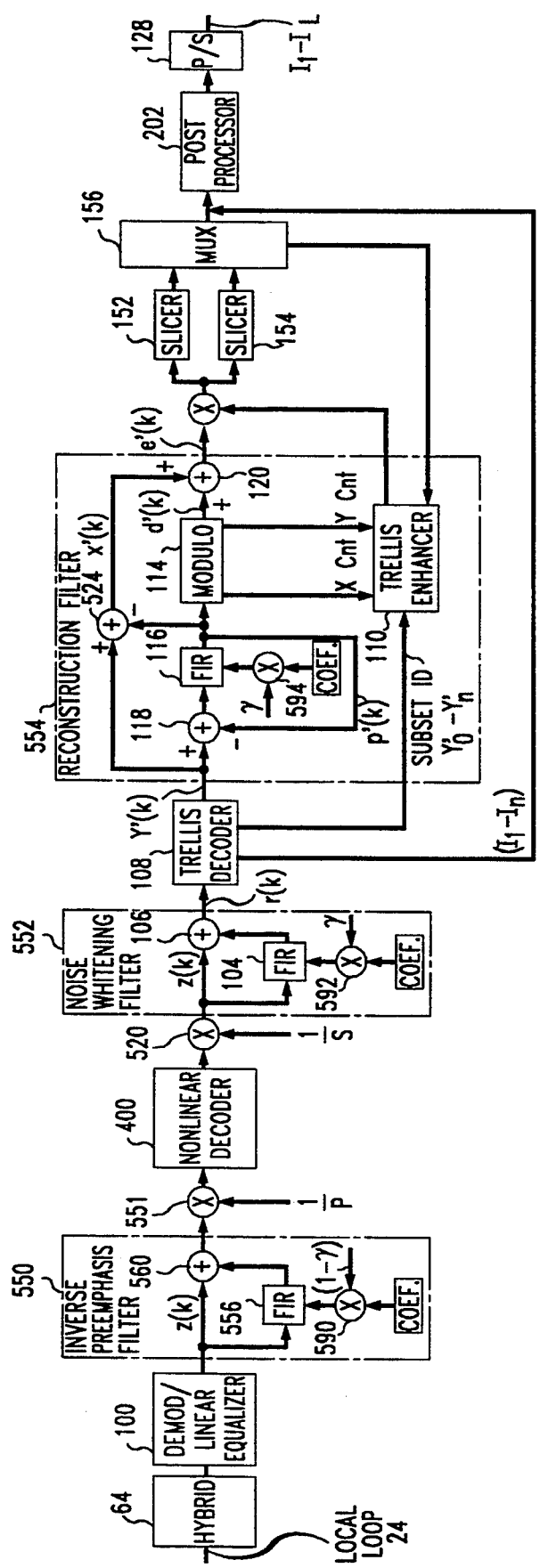
FIG. 25 illustrates the embodiment of FIG. 23 with scaled filter coefficients.

FIGS. 24 and 25 illustrate the transmitter of FIGS. 22 and the receiver of FIG. 23, respectively, using a configuration where the filter outputs are scaled by scaling the filter coefficients or taps. FIG. 24 is identical to FIG. 22 except that multiplier 530 has been removed and replaced with multiplier 580. Coefficients used by filter 66 are multiplied by $\gamma$ using multiplier 580. Additionally, multiplier 536 has been removed and multiplier 582 is used to multiply the coefficients used by filter 534. Multiplier 582 multiplies the coefficients by the value $1-\gamma$.

FIG. 25 is similar to FIG. 23 except that the outputs of filters 556, 104 and 116 are controlled using multipliers 590, 592 and 594, respectively. As in the case of FIG. 24, the filter outputs are controlled by multiplying the filter coefficients rather than the filter outputs. The coefficients used by filter 556 are multiplied by $1-\gamma$ using multiplier 590. The coefficients used by filter 104 are multiplied by $\gamma$ using multiplier 592, and, the coefficients used by filter 116 are multiplied by $\gamma$ using multiplier 594.

Figure 26:
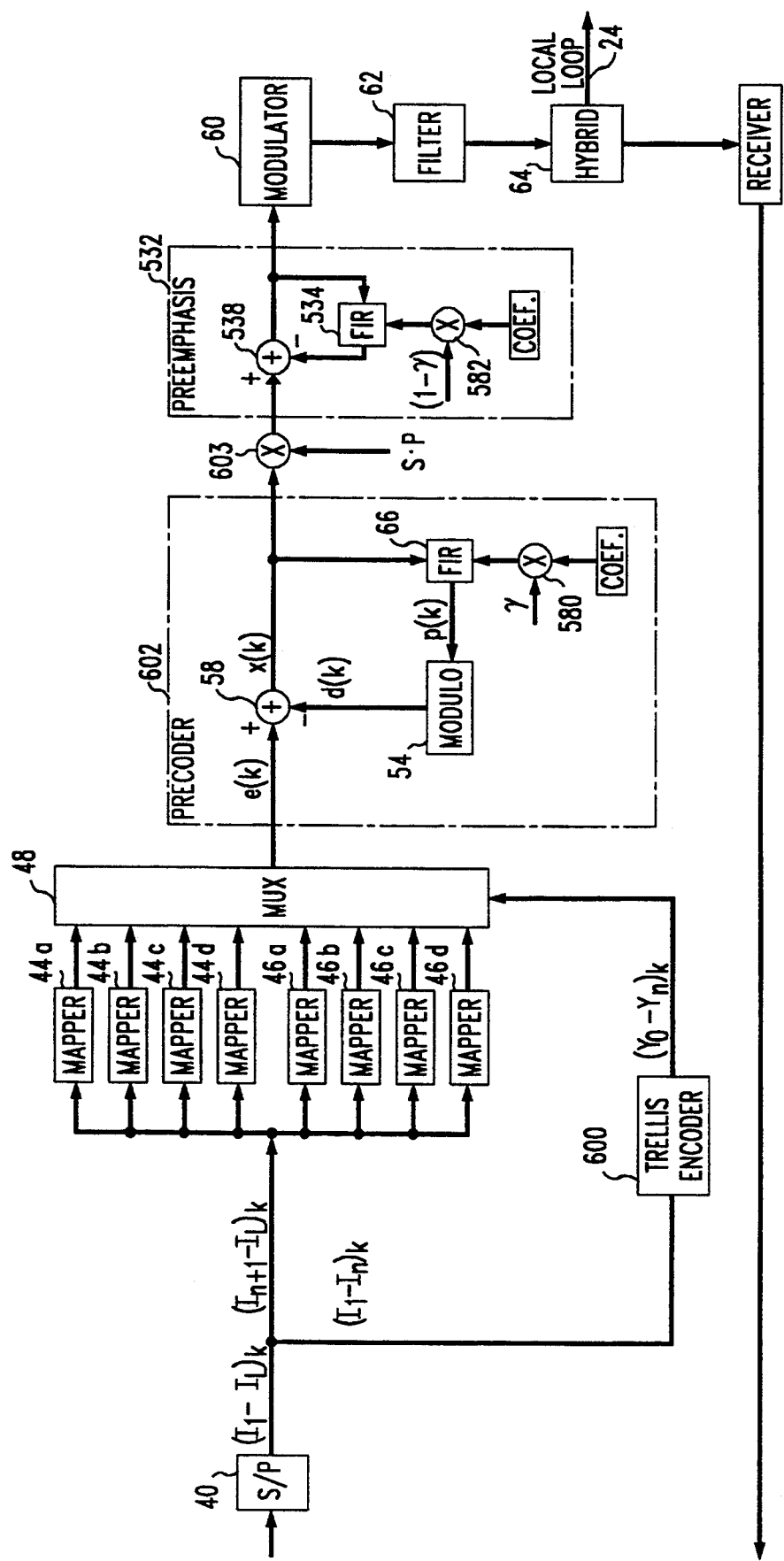
FIG. 26 illustrates a transmitter without a trellis enhancer.
Figure 27:
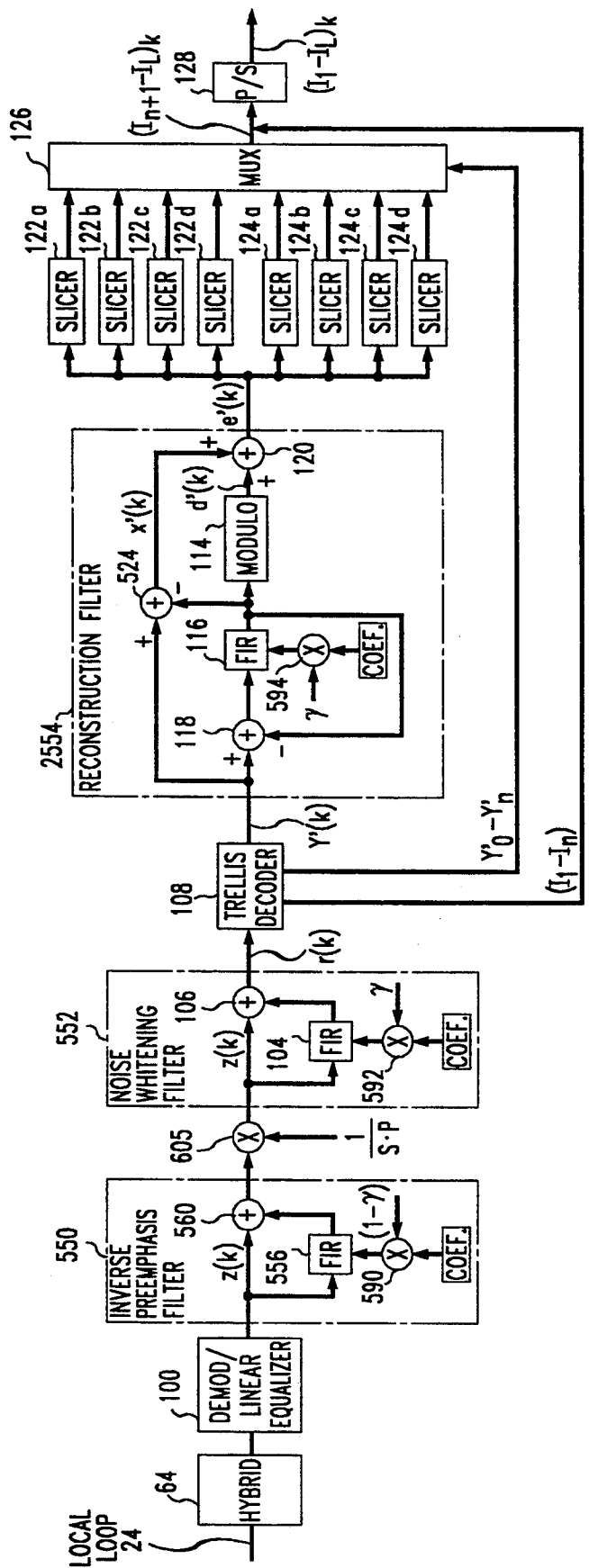
FIG. 27 illustrates a receiver without a trellis enhancer.

Other embodiments of the present invention may comprise configurations that provide control of the amount of precoding and preemphasis without including trellis enhancers 52 and 110, preprocessor 200 and post processor 202, or nonlinear encoder 300 and nonlinear decoder 400. FIGS. 26 and 27 illustrate a transmitter and receiver, respectively, of one such embodiment. In reference to FIG. 26, trellis encoder 600 encodes the data in a conventional manner, precoder 602 controls the amount of precoding, multiplier 603 performs the scaling operations of multipliers 508 and 540, and preemphasis device 532 controls the amount of preemphasis. As was discussed earlier, the value of $\gamma$ is used to control the amount of precoding and preemphasis. FIG. 27 illustrates a receiver where inverse preemphasis filter 550, noise whitening filter 552, multiplier 605 which compensates for multiplier 603 of FIG. 26, and reconstruction filter 2554 generally operates as described previously. Note that in reconstruction filter 2554 no trellis enhancer is needed because the transmitter does not use a trellis enhancer.

Figure 28:
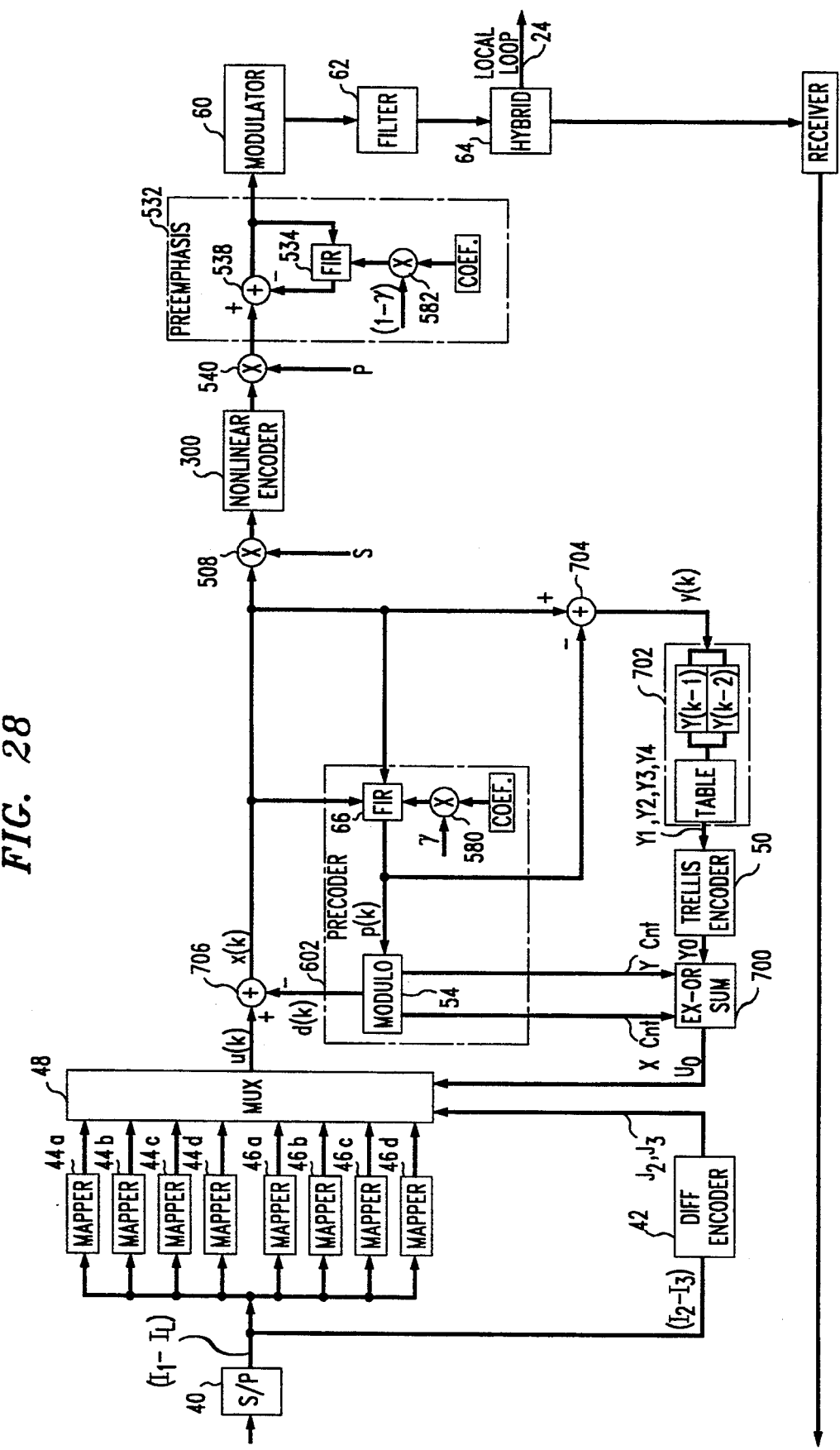
FIGS. 28 illustrates a transmitter with feedback trellis encoding.

FIG. 28 illustrates the transmitter of another embodiment of the present invention. This embodiment adaptively controls precoding and preemphasis in a system that uses feedback trellis encoding to choose between constellation subsets. Serial-to-parallel converter 40 receives serial data and converts it into an L-bit wide word. Bits 12 and 13 are fed to differential encoder 42 which operates as described earlier to produce bits J2 and J3. The remaining bits are passed to mappers 44a through 44d, and 46a through 46d. As described with regard to FIG. 3, each mapper is used to map the remaining bits to a signal point within one of the constellation subsets. The output from the mappers are received by mux 48. Mux 48 is used to select one of the mapper outputs based on bits J2 and J3, and bit U0 from exclusive- or/summer 700. Exclusive-or/summer 700 receives inputs X-Cnt and Y-Cnt from modulo device 54, and bit $Y_0$ from trellis encoder 50. Modulo device 54 and trellis encoder 50 operate as was described earlier. With regard to trellis encoder 50, bits Y1 through Y4 which are received from slicer/table 702, are used as inputs to an encoder such as the encoder of FIG. 5. (In this case, bits Y1, J2, J3, Y4 are equal to bits Y1, Y2, Y3 and Y4 respectively.) In this embodiment, 4-dimensional encoding is used so that new Y0, J2 and J3 bits are produced every other symbol period. It is also possible to use 2-dimensional encoding where new bits are produced every symbol period.

Slicer/table 702 produces bits Y1 through Y4 based on two consecutive prior samples of signal y(k) from summer 704. Slicer/table 702 first identifies the constellation subset to which $y(k-1)$ and $y(k-2)$ belong. After identifying the subsets, Y1 through Y4 are produced in accordance with the table of FIG. 29.

Returning to exclusive-or/summer 700, inputs X-Cnt and Y-Cnt, which were produced by modulo device 54 in response to $p(k-2)$, are summed with each other to produce a first symbol period sum. The first symbol period sum is then added to a second symbol period sum which was produced by adding the X-Cnt and Y-Cnt values that were produced in response to $p(k-1)$. The summations performed by exclusive-or/summer 700 are modulo 2 summations. The result of the modulo 2 summations is exclusive-ored with bit Y0 from trellis encoder 50 to produce output bit U0. This calculation is performed every two symbol periods, therefore, output U0 remains the same for two symbol periods.

In an embodiment using 2-dimensional encoding, only a new U0 is produced each symbol period. Exclusive-or/summer 700 produces a new sum every symbol period using p(k−1), trellis encoder 50 produces a new Y0 every symbol period, and U0 and Y0 are exclusive-ored to produce a new U0 every symbol period.

Once bits J2, J3 and U0 are specified, the output of mux 48 provides the appropriate mapper output to the input of summer 706. Summer 706 subtracts dither signal d(k), which was produced by modulo device 54, from the output of mux 48. The output of summer 706 is signal x(k). Signal x(k) is used by FIR filter 66 to produce signal p(k+1) which is used as an input to modulo device 54 to produce signal d(k+1). Signal x(k) is also used as an input to summer 704. Signal p(k) is subtracted from signal x(k) in summer 704 to produce signal y(k). As was described with regard to FIG. 3, FIR filter 66 and modulo device 54 calculate values p(k) and d(k) respectively using prior signals x(k−1), x(k−2), etc. depending on the number of taps in FIR filter 66.

The output of summer 706, signal x(k), is passed through multiplier 508, nonlinear encoder 300, multiplier 540, preemphasis filter 532, modulator 60, filter 62 and hybrid 64 out to local loop 24 as was discussed earlier.

As was described earlier with regard to FIG. 24, the value of γ and (1−γ) is provided to multipliers 580 and 582 respectively, to control the amount of precoding and preemphasis.

Figure 30:
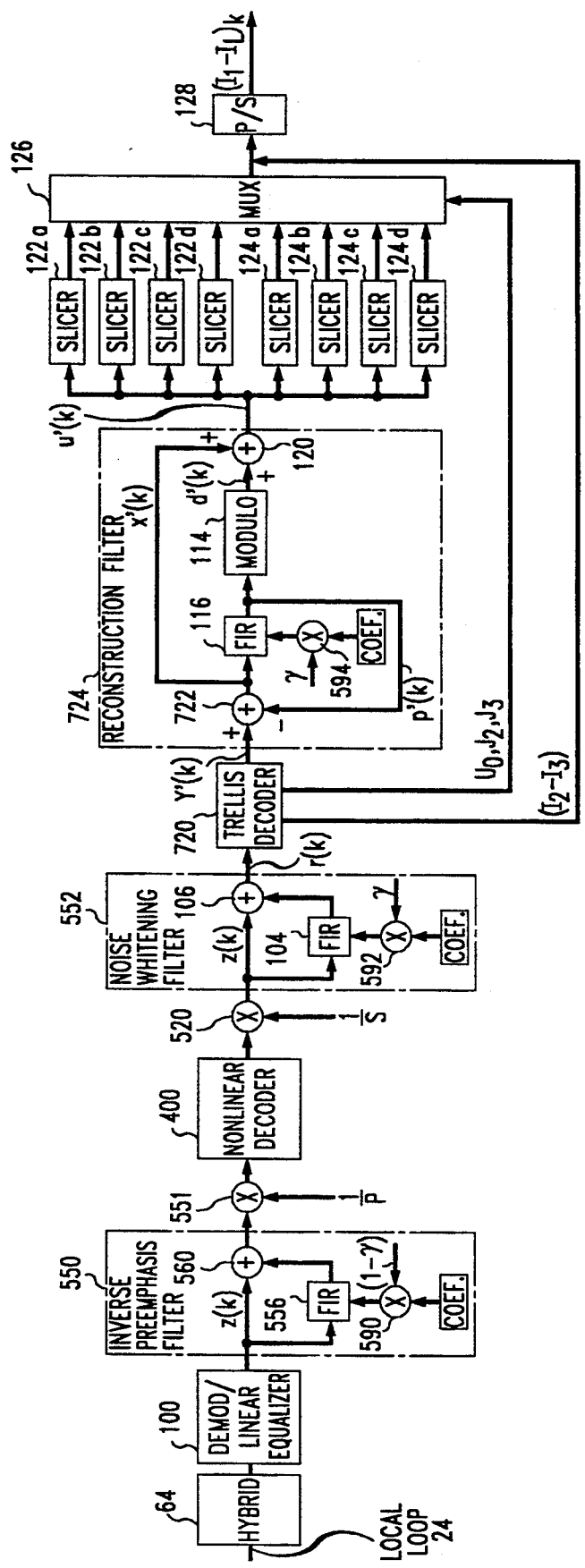
FIG. 30 illustrates a receiver corresponding to the transmitter of FIG. 28.

FIG. 30 illustrates a receiver corresponding to the transmitter of FIG. 28. A signal from local loop 24 is received by hybrid 64 and provided to demodulator/linear equalizer 100. The signal from the demodulated linear equalizer is then passed through inverse preemphasis filter 550, multiplier 551, nonlinear decoder 400 and multiplier 520. The signal from multiplier 520 is passed through noise whitening filter 552 and to trellis decoder 720. Demodulator linear equalizer 100, preemphasis filter 550, multiplier 520, nonlinear decoder 400 and noise whitening filter 552 operate as previously described. Trellis decoder 720 performs the well-known Viterbi algorithm to produce bits U0, J2 and J3. Bits U0, J2 and J3 are provided to mux 126 to select an output from one of slicers 122a through 122d, and 124a through 124d. Output Y'(k) from trellis decoder 720 is provided to summer 722 of reconstruction filter 724. The signal from summer 722 is provided to FIR filter 116 and summer 120. The output of FIR filter 116 is provided to modulo device 114, and the summer 722. The output of modulo device 114 is provided to summer 120. The output of summer 120 is provided to slicers 122a through 122d, and 124a through 124d where each slicer uses signal U'(k) to identify a signal point within a constellation subset. Mux 126 under the control of bits U0, J2 and J3, selects one slicer output. The bits at the output of mux 126, and bits I2 and I3, which are provided by trellis decoder 720, are passed to parallel-to-serial converter 128 to recover the original serial data.

As was described with regard to FIG. 25, the value of (1−γ) is provided to multiplier 590, and the value of γ is provided to multipliers 592 and 594. The value γ used in the receiver is equal to the value of γ used in the transmitter so that the relative amounts of precoding and preemphasis provided in the transmitter can be compensated for in the receiver.

Although the various functional blocks of the transmitter and receiver are shown for pedagogic clarity as individual discrete elements, the functions of those blocks could and, with present technology, typically would be carried out by one or more programmed processors, digital signal processing (DSP) chips, etc., as is well known to those skilled in the art.

The invention is disclosed in the context of a system using two-dimensional constellations. However, it is equally applicable to systems using constellations of any dimensionality, as will be well appreciated by those skilled in the art.

It is also important to note that the invention is not limited to modem technology but rather to any type of signal transmission system and/or environment in which inter-symbol interference and/or deterministic, non-linear effects are present.

Thus it will be appreciated that many and varied arrangements may be devised by those skilled in the art which, although not explicitly shown or described herein, embody the principles of the invention and are thus within its spirit and scope.

We claim:

1. A method of transmitting data over a communication channel between a transmitter and a receiver, comprising the steps of:
   selecting a signal point from a predefined signal point constellation using a data word to generate a signal point value;
   generating a precoding value by performing a modulo operation on a first filter output obtained using a first plurality of prior precoded signal point values;
   modifying said precoding value using a first scalar value to generate a modified precoding value, said first scalar value being transferred between the transmitter and the receiver;
   combining said modified precoding value and said signal point value to generate a precoded signal point value;
   generating a modified preemphasis value using a second scalar value and a second filter output obtained from a second filter using a second plurality of prior modified signal point values representative of prior transmitted signal points, said second scalar value being transferred between the transmitter and the receiver; and
   combining said precoded signal point value, and said modified preemphasis value to form a modified signal point value, said modified signal point value being transferred to the receiver.

2. The method of claim 1, further comprising the step of measuring proportional noise and changing said second scalar value to increase preemphasis when proportional noise increases.

3. The method of claim 1, further comprising the step of measuring additive noise and changing said first scalar value to increase precoding when additive noise increases.

4. The method of claim 1, wherein a sum of said first and second scalar values equals one.

5. A method of claim 1, wherein said step modifying said precoding value comprises using said first scalar to modify a coefficient of said first filter.

6. The method of claim 1, wherein said step generating said modified preemphasis value comprises using said second scalar to modify a coefficient of said second filter.

7. A method of transmitting data over a communication channel between a transmitter and a receiver, comprising the steps of:

selecting a signal point from a predefined signal point constellation using a data word to generate a signal point value;

generating a precoding value by performing a modulo operation on a filter output obtained using a plurality of prior modified signal point values representative of prior transmitted signal points;

modifying said precoding value using a first scalar value to generate a modified precoding value, said first scalar value being transferred between the transmitter and the receiver;

generating a modified preemphasis value using a second scalar value and said filter output, said second scalar value being transferred between the transmitter and the receiver; and combining said signal point value, said modified precoding value and said modified preemphasis value to form a modified signal point value, said modified signal point value being transferred to the receiver.

8. The method of claim 7, further comprising the step of measuring proportional noise and changing said second scalar value to increase preemphasis when proportional noise increases.

9. The method of claim 7, further comprising the step of measuring additive noise and changing said first scalar value to increase precoding when additive noise increases.

10. The method of claim 7, wherein a sum of said first and second scalar values equals one.

11. A method of communicating data over a communication channel, comprising the steps of:

selecting a signal point from a predefined signal point constellation using a data word to generate a signal point signal;

generating a precoding signal using a first scalar to control a magnitude of said precoding signal, said first scalar having a first value communicated to a receiver;

generating a preemphasis signal using a second scalar to control a magnitude of said preemphasis signal, said second scalar having a second value communicated to the receiver;

forming a modified signal point signal using said signal point signal, said preemphasis signal and said precoding signal; and transmitting a signal representative of said modified signal point signal over the communication channel.

12. The method of claim 11, wherein said step of generating a precoding signal comprises using a first filter and a plurality of prior signal point signals to generate a first filter output; and performing a modulo operation on said first filter output.

13. The method of claim 12, wherein said step of generating said preemphasis signal comprises using said first filter output.

14. The method of claim 11, wherein said step of generating said preemphasis signal comprises using a second filter and said plurality of prior signal point signals.

15. The method of claim 11, wherein a sum of said first and second values equals one.

* * * * *